(12) United States Patent
Crisan et al.

(10) Patent No.: US 11,349,961 B2
(45) Date of Patent: May 31, 2022

(54) CHAINED ADAPTERS FOR MULTIPLE VERSIONS OF APPLICATION PROGRAMMING INTERFACE

(71) Applicant: Sage Intacct, Inc., San Jose, CA (US)

(72) Inventors: Valer Crisan, San Jose, CA (US); Roy Liu, Fremont, CA (US)

(73) Assignee: Sage Intacct, Inc., San Jose, CA (US)

( * ) Notice: Subject to any disclaimer, the term of this patent is extended or adjusted under 35 U.S.C. 154(b) by 0 days.

(21) Appl. No.: 17/066,304

(22) Filed: Oct. 8, 2020

(65) Prior Publication Data

US 2022/0116480 A1 Apr. 14, 2022

(51) Int. Cl.
*H04L 67/01* (2022.01)
*G06F 9/54* (2006.01)
*G06F 8/71* (2018.01)
*H04L 67/52* (2022.01)

(52) U.S. Cl.
CPC ............. *H04L 67/42* (2013.01); *G06F 8/71* (2013.01); *G06F 9/547* (2013.01); *H04L 67/18* (2013.01)

(58) Field of Classification Search
CPC . H04L 67/42; H04L 67/18; G06F 8/71; G06F 8/656
See application file for complete search history.

(56) References Cited

U.S. PATENT DOCUMENTS

| | | | | |
|---|---|---|---|---|
| 7,949,999 | B1 * | 5/2011 | Willeford | G06F 8/656 717/120 |
| 8,458,733 | B2 * | 6/2013 | Kim | G06F 9/44 719/330 |
| 9,823,950 | B1 * | 11/2017 | Carrier | G06F 9/541 |
| 10,360,082 | B2 * | 7/2019 | Lincoln | G06F 9/541 |
| 10,560,520 | B2 * | 2/2020 | Wang | H04L 67/02 |
| 2003/0177170 | A1 * | 9/2003 | Glass | H04L 67/28 709/203 |

(Continued)

OTHER PUBLICATIONS

Lin et al., "Study and Technological Realization about Heterogeneous Data Integration Based on XML Schema", 2009 International Conference on Test and Measurment, I(EEE Publishing.*

(Continued)

*Primary Examiner* — Todd L Barker
(74) *Attorney, Agent, or Firm* — Raubvogel Law Office

(57) ABSTRACT

An adapter layer transforms requests generated by an external API according to internal back-end specifications, and also transforms responses received from the back-end software before such responses are sent to the external API. The adapter layer may include any number of chained adapters, configured so that the output of one adapter is provided as input for another adapter. Each adapter can be configured to transform requests and/or responses between one API version and an immediately preceding or succeeding API version. An appropriate chain of adapters can be activated to perform transformations as needed between a particular API and the format expected by the back-end software. Development of adapters is thus simplified, as the system avoids the need to provide different adapters for each possible combination of software versions operating with one another and with the back-end software.

24 Claims, 21 Drawing Sheets

(56) References Cited

U.S. PATENT DOCUMENTS

| | | | |
|---|---|---|---|
| 2006/0059543 A1* | 3/2006 | Knowles | H04L 41/12 726/4 |
| 2009/0210631 A1* | 8/2009 | Bosworth | G06F 12/0875 711/141 |
| 2010/0319050 A1* | 12/2010 | Russell | G06F 8/71 726/1 |
| 2012/0041964 A1* | 2/2012 | Kreiner | G06F 16/1794 707/756 |
| 2016/0267170 A1* | 9/2016 | Hastings | H04L 67/2819 |
| 2017/0237762 A1* | 8/2017 | Ogawa | G06F 16/13 726/23 |
| 2019/0394189 A1* | 12/2019 | Thirumalai | H04L 63/102 |

OTHER PUBLICATIONS

Magill et al., "Automating object transformations for dynamic software updating", ACM SIGPLAN Notices, vol. 47, No. 10, Oct. 2012, ACM Publishing.*

Tovarnak et al., "Normalization of Unstructured Log Data into Streams of Structured Event Objects", 2019 IFIP/IEEE Symposium on Integrated Network and Service Management, Apr. 2019, IEEE Publishing.*

"Anti-Corruption Layer Pattern", https://docs.microsoft.com/en-us/azure/architecture/patterns/anti-corruption-layer, Jun. 23, 2017, 3 pages.

\* cited by examiner

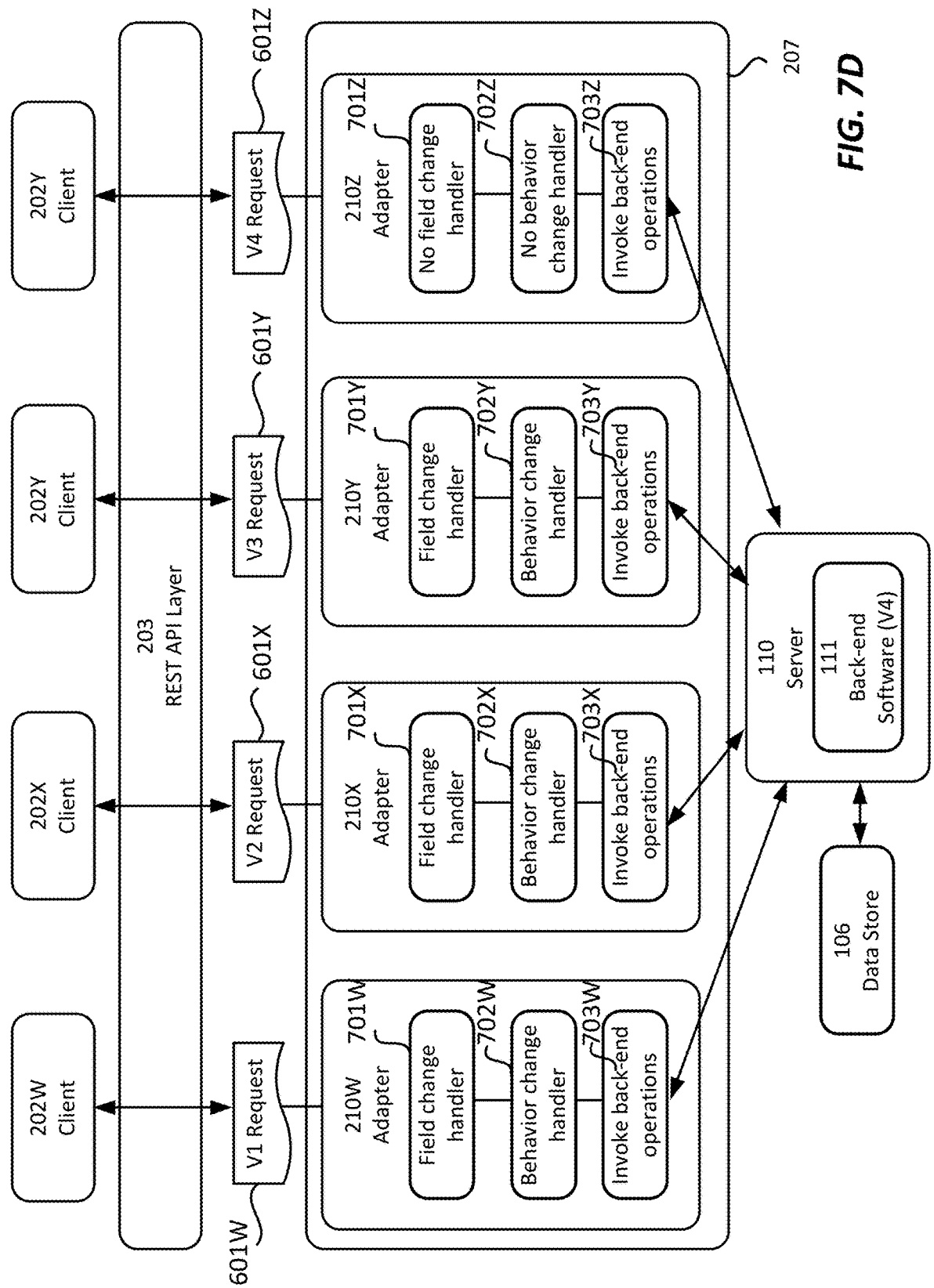

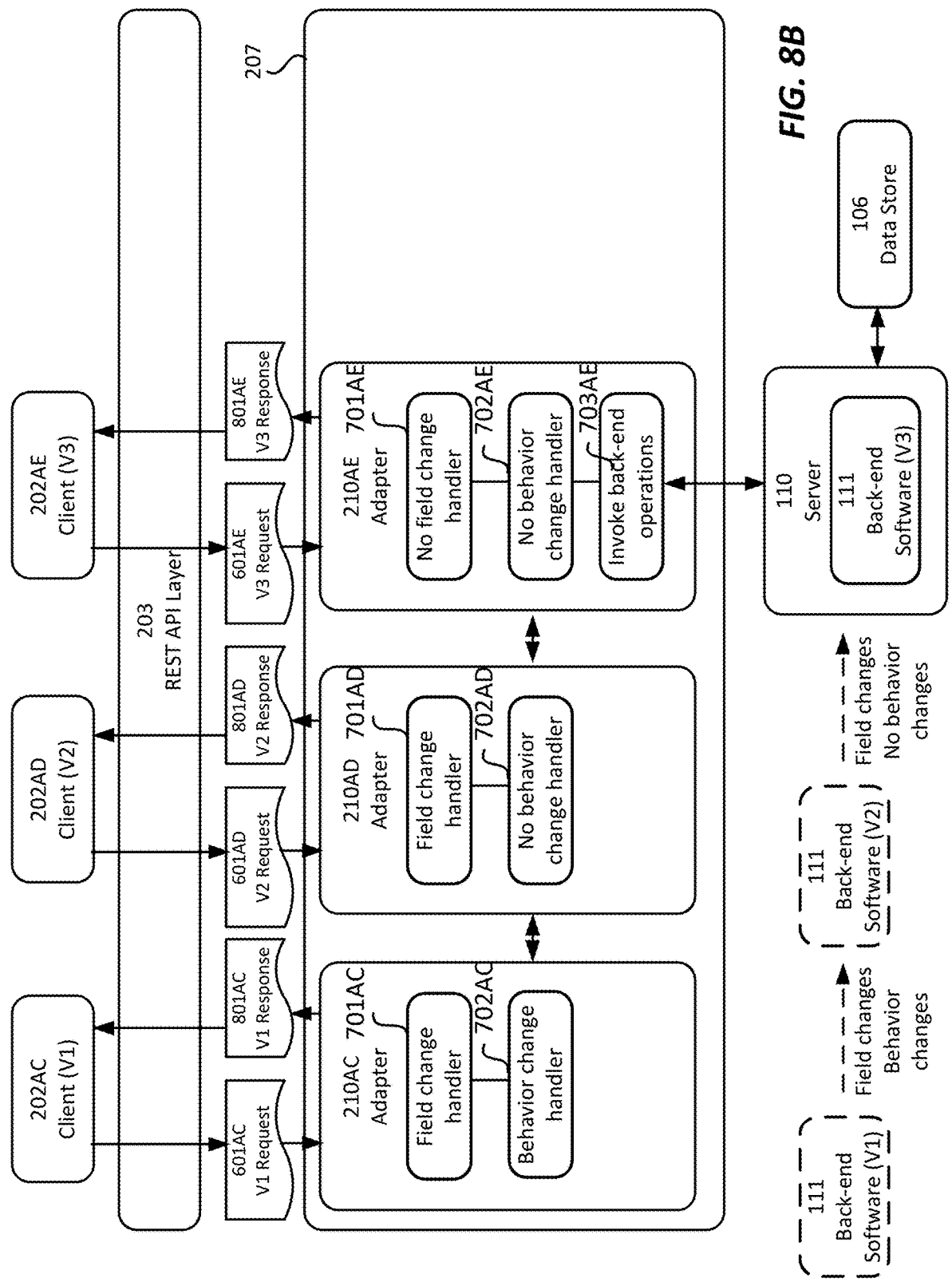

CHAINED ADAPTERS FOR MULTIPLE VERSIONS OF APPLICATION PROGRAMMING INTERFACE

TECHNICAL FIELD

The present document relates to techniques for managing multiple versions of an application programming interface.

BACKGROUND

An Application Programming Interface (API) is a software intermediary that allows two applications to communication with one another and to work together. In many software environments, an API allows development of a front-end component that can run on a client device, while the API manages communications and interactions with a back-end (such as a business logic component) running on a server machine.

Often, APIs are updated as new versions of software applications are released. For example, an updated API may be needed to ensure that an older front-end component can operate with a new version of a back-end component, or to ensure that a newly released front-end component can operate with an older back-end component.

Such a situation can create challenges when multiple versions of a software front-end are in use concurrently, for example by different users, and a single back-end version is tasked with communicating with the various API versions associated with the software front-end components. Adapters may be developed to allow various APIs to communicate with the single back-end version. However, it can be challenging to ensure backward compatibility for all API versions that are extant at any given time. Management and upkeep of multiple different adapters can be cumbersome and difficult.

SUMMARY

In various embodiments, the system and method described herein ensure backward compatibility between a back-end software component and any number of API versions. The described techniques allow some users to continue to run older versions of client software, while other users run updated versions. By employing the techniques described herein, all such versions can operate effectively with one another, and with a single version of a back-end software component running the business logic that underpins operation of the system.

In at least one embodiment, an adapter layer is introduced between the API and the back-end software running at a server. The adapter layer can implement a single public schema for the API, which maps to internal details of the back-end software. The adapter layer transforms requests generated by the external API according to internal back-end specifications, and also transforms responses received from the back-end software before such responses are sent to the external API; the adapter layer thus enables effective communication between the API and the back-end software.

In at least one embodiment, adapters can be chained within the adapter layer. Thus, the output of one adapter can be provided as input for another adapter. Each adapter can thereby be configured to transform requests and/or responses between one API version and an immediately preceding or succeeding API version. Each adapter need not provide functionality to transform requests between each version and the format expected by the back-end software directly; rather, an appropriate chain of adapters can be activated to perform transformations as needed between a particular API and the format expected by the back-end software. Development of adapters is thus simplified, as the system avoids the need to provide different adapters for each possible combination of software versions operating with one another and with the back-end software.

Furthermore, the described system avoids the need to update each adapter (for each API version) whenever the back-end software changes. Rather, a single adapter can be developed to handle changes from the previous version of the back-end software to the current version, and that adapter can be chained with other, previously developed adapters, as needed.

For example, if three API versions are provided, they may be designated as API #1, #2, and #3. Three adapters may be provided in a chained arrangement; these adapters may be designed as V1, V2, and V3. When a request is received from API #1, a first adapter (designated adapter V1) may be activated to handle it. When adapter V1 receives the request, it transforms the request to conform to the input expected by adapter V2; adapter V2 is then invoked. When adapter V2 receives the request, it transforms the request to conform to the input expected by adapter V3; adapter V3 is then invoked. Adapter V3, being the latest version, invokes the back-end directly.

When the back-end receives the request, it generates a response. The response then travels backwards to adapters V3, V2, and V1, in succession, each adapter transforming the response to the input expected by the next adapter. The output of adapter V1 is the response as API #1 expects to receive it. API #1 can therefore interpret the response as appropriate, including transmitting it to a client, presenting it to a user, storing it, and/or the like.

When a request is received from API #2, a similar process can take place, except that adapter V1 can be skipped, since API #2 can communicate directly with adapter V2. When a request is received from API #3, a similar process can take place, except that adapters V1 and V2 can be skipped, since API #3 can communicate directly with adapter V3.

As discussed above, in such a scenario, when a new version of back-end is introduced, adapters V1, V2, and V3 do not have to be updated. Rather, a new adapter V4 can be introduced to translate between adapter V3 and the back-end.

Alternatively, adapter V3 can be renamed as adapter V4, and a new (simpler) adapter V3 can be introduced to translate between adapters V2 and V4. No changes need be made to adapters V1 and V2.

In at least one embodiment, a generic adapter can be used, which can be configured to deal with most of the changes that happen from one version to another. In many cases, such changes mostly involve exposing new objects and adding new fields to existing objects; a generic adapter can be developed that easily handles such changes, thus reducing maintenance costs further. In at least one embodiment, the generic adapter is based on an object and API schema definition/mapping, and is designed to handle a predefined set of differences between versions.

The techniques described herein thereby enable support of multiple versions of APIs and further enables such APIs to communicate with a single version of back-end software, while minimizing maintenance costs.

Further details and variations are described herein.

BRIEF DESCRIPTION OF THE DRAWINGS

The accompanying drawings, together with the description, illustrate several embodiments. One skilled in the art will recognize that the particular embodiments illustrated in the drawings are merely exemplary, and are not intended to limit scope.

FIGS. 7A through 7D are block diagrams depicting examples of an adapter layer with standalone adapters, according to one embodiment.

FIGS. 8A through 8C are block diagrams depicting examples of an adapter layer with chained adapters, according to one embodiment.

DETAILED DESCRIPTION OF THE EMBODIMENTS

Figure 1A:
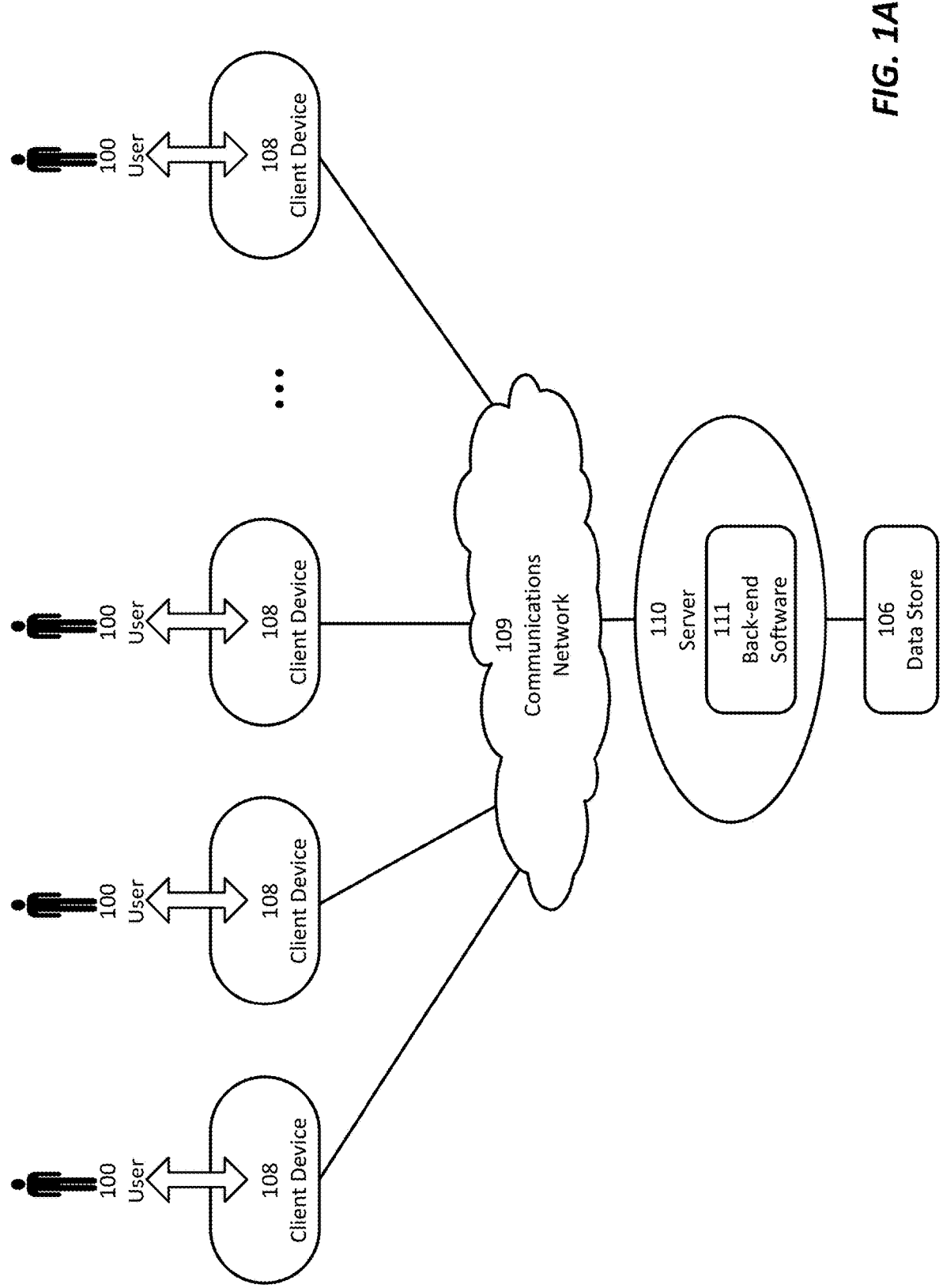
FIG. 1A is a block diagram depicting a hardware architecture for implementing the techniques described herein in a client/server environment, according to one embodiment.

The systems and methods set forth herein may be applied to many contexts in which it can be useful to provide support for multiple versions of APIs and to enable such APIs to communicate with a single back-end version. For illustrative purposes, the description herein is set forth with respect to a method and system for providing an adapter layer that supports multiple versions of APIs via chained adapters, as implemented in a client/server-based accounting software package. One of skill in the art will recognize that the systems and methods described herein may be implemented in a wide variety of other contexts. In addition, the particular hardware and software arrangements depicted and described herein are presented as simplified examples for illustrative purposes.

In some embodiments, one or more components, as shown and described below in connection with FIGS. 1A and 1B, may be used to implement the system and method described herein. Such components may be implemented in a cloud computing-based client/server architecture, using, for example, Amazon Web Services, an on-demand cloud computing platform available from Amazon.com, Inc. of Seattle, Wash. Therefore, for illustrative purposes, the system and method are described herein in the context of such an architecture. One skilled in the art will recognize, however, that the system and method can be implemented using other architectures, such as for example a stand-alone computing device rather than a client/server architecture.

Further, the functions and/or method steps set forth below may be carried out by software running on one or more of client device(s) 108, server 110, and/or other components. This software may optionally be multi-function software that is used to retrieve, store, manipulate, and/or otherwise use data stored in data storage devices such as data stores 106, 112, and/or to carry out one or more other functions.

In this application, a "user", such as user 100 referenced herein, is an individual, enterprise, or other group, which may optionally include one or more users. A "data store", such as data stores 106, 112 referenced below, is any device capable of digital data storage, including any known hardware for nonvolatile and/or volatile data storage. A collection of data stores 106 and/or 112 may form a "data storage system" that can be accessed by multiple users. A "computing device", such as client device(s) 108, is any device capable of digital data processing. A "server", such as server 110, is a computing device that provides data storage, either via a local data store, or via connection to a remote data store. A "client device", such as client device 108, is an electronic device that communicates with a server (such as server 110), provides output to a user (such as user 100), and accepts input from a user (such as user 100).

System Architecture

According to various embodiments, the system and method can be implemented on any electronic device or set of interconnected electronic devices, each equipped to receive, store, and present information. Each electronic device may be, for example, a server, desktop computer, laptop computer, smartphone, tablet computer, and/or the like. As described herein, some devices used in connection with the system described herein are designated as client devices, which are generally operated by end users. Other devices are designated as servers, which generally conduct back-end operations and communicate with client devices (and/or with other servers) via a communications network such as the Internet. In at least one embodiment, the methods described herein can be implemented in a cloud computing environment using techniques that are known to those of skill in the art.

In addition, one skilled in the art will recognize that the techniques described herein can be implemented in other contexts, and indeed in any suitable device, set of devices, or system capable of interfacing with existing enterprise data storage systems. Accordingly, the following description is intended to illustrate various embodiments by way of example, rather than to limit scope.

Referring now to FIG. 1A, there is shown a block diagram depicting a hardware architecture for practicing the described system in a cloud-based or client/server environment, according to one embodiment. Any number of client devices 108, each operated by a user 100, can communicate with server 110 running back-end software 111. As described below, the techniques described herein allow the various client devices 108 to be running different versions of client software (including different API versions), while still being able to communicate and interact with server 110 running a single version of back-end software 111. Server 110 can also access data store 106 as needed to service requests from client devices 108 and to perform other operations. Any number of server(s) 110 can be provided; the description set forth herein assumes a single server 110 for clarity.

Each client device 108 can be any electronic device, such as a desktop computer, laptop computer, personal digital assistant (PDA), cellular telephone, smartphone, music player, handheld computer, tablet computer, kiosk, game system, wearable device, or the like. Any suitable type of communications network 109, such as the Internet, can be used as the mechanism for transmitting data (such as requests and responses) between client devices 108 and server 110, according to any suitable protocols and techniques. In addition to the Internet, other examples include cellular telephone networks, EDGE, 3G, 4G, 5G, long term evolution (LTE), Session Initiation Protocol (SIP), Short Message Peer-to-Peer protocol (SMPP), 557, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, client devices 108 use API's to generate and transmit requests for data via communications network 109, and receive responses from server 110 containing the requested data. Such requests may be sent via HTTP as remote procedure calls or the like.

Such an implementation may use a "black box" approach, whereby data storage and processing are done completely independently from user input/output. An example of such a client/server environment is a web-based implementation, wherein each client device 108 runs a browser that provides a user interface for interacting with web pages and/or other web-based resources from server 110. Items from data store 106 can be presented as part of such web pages and/or other web-based resources, using known protocols and languages such as Hypertext Markup Language (HTML), Java, JavaScript, and the like.

In one implementation, server 110 is responsible for data storage and processing. Under the direction of back-end software 111, server 110 can access and maintain data store 106. Server 110 may include additional components as needed for retrieving data from data store 106 in response to requests from client device 108.

Data store 106 may be organized into one or more well-ordered data sets, with one or more data entries in each set. Data store 106, however, can have any suitable structure, and may store data according to any organization system known in the information storage arts, such as databases and other suitable data storage structures. For example, in at least one embodiment, data store 106 may store accounting transaction data and/or other data.

In at least one embodiment, data store 106 may be organized in a file system, using well known storage architectures and data structures, such as relational databases. Examples include Oracle, MySQL, and PostgreSQL. Appropriate indexing can be provided to associate data elements in data store 106 with each other. In at least one embodiment, data store 106 may be implemented using cloud-based storage architectures such as NetApp (available from NetApp, Inc. of Sunnyvale, Calif.) and/or Google Drive (available from Google, Inc. of Mountain View, Calif.).

Data store 106 can be local or remote with respect to server 110. In at least one embodiment, server 110 may be configured to retrieve data from a remote data storage device when needed. Such communication between server 110 and other components can take place wirelessly, by Ethernet connection, via a computing network such as the Internet, via a cellular network, or by any other appropriate communication systems.

In at least one embodiment, data store 106 is detachable in the form of a CD-ROM, DVD, flash drive, USB hard drive, or the like. Information can be entered from a source outside of server 110 into a data store 106 that is detachable, and later made available after the data store 106 is connected to server 110. In another embodiment, data store 106 is fixed within or attached to server 110.

In some embodiments, data within data store 106 may be distributed among multiple physical servers. Thus, data store 106 may represent one or more physical storage locations, which may communicate with each other via the communications network and/or one or more other networks (not shown).

Figure 1B:
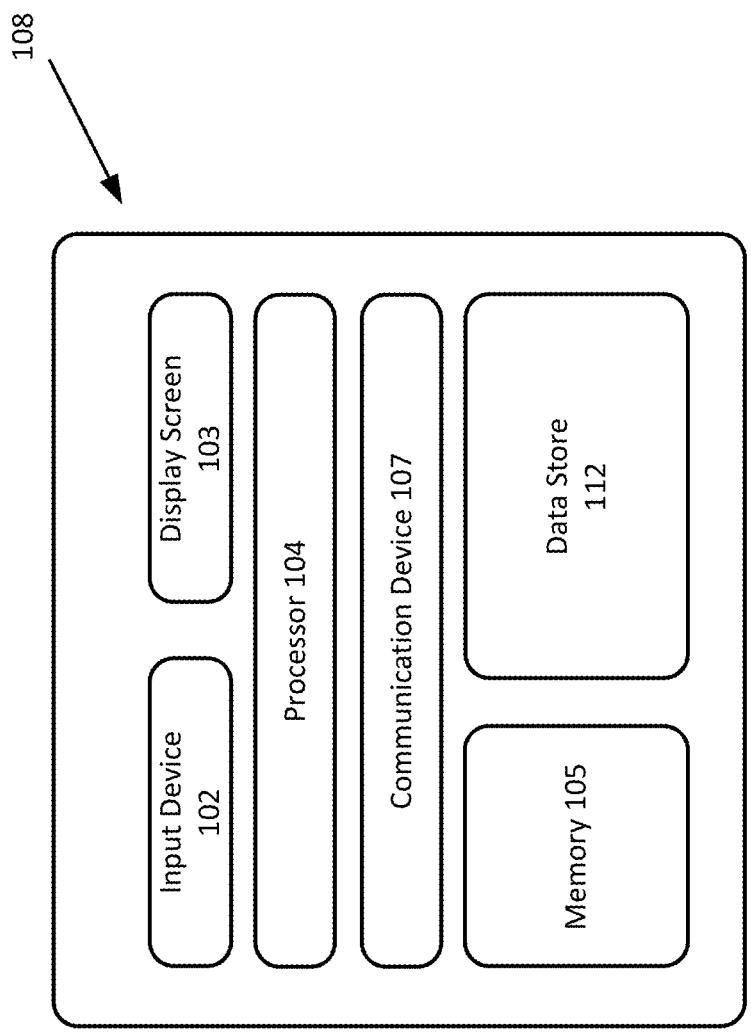
FIG. 1B is a block diagram depicting a hardware architecture for a client device that can be used in connection with the described techniques, according to one embodiment.

Referring now to FIG. 1B, there is shown a block diagram depicting a hardware architecture for a client device 108 that can be used in connection with the described techniques, according to one embodiment. As mentioned above, client device 108 may be any electronic device, such as a desktop computer, laptop computer, personal digital assistant (PDA), cellular telephone, smartphone, music player, handheld computer, tablet computer, kiosk, game system, wearable device, or the like. The various client devices 108 depicted in FIG. 1A may be the same type as one another, or they may be different types.

In at least one embodiment, client device 108 includes a number of hardware components well-known to those skilled in the art. Input device 102 can be any element that receives input from user 100, including, for example, a keyboard, mouse, stylus, touch-sensitive screen (touchscreen), touchpad, trackball, accelerometer, microphone, or the like. Input can be provided via any suitable mode, including for example, one or more of: pointing, tapping, typing, dragging, and/or speech. In at least one embodiment, input device 102 can be omitted or functionally combined with one or more other components.

Data store 112 can be any magnetic, optical, or electronic storage device for data in digital form; examples include flash memory, magnetic hard drive, CD-ROM, DVD-ROM, or the like. In at least one embodiment, data store 112 stores information that can be utilized and/or displayed according to the techniques described below. Data store 112 may be implemented in a database or using any other suitable arrangement. In another embodiment, data store 112 can be stored elsewhere, and data from data store 112 can be retrieved by client device 108 when needed for processing and/or presentation to user 100. Data store 112 may store one or more data sets, which may be used for a variety of purposes and may include a wide variety of files, metadata, and/or other data. In at least one embodiment, data store 112 may store a subset of data found at server-based data store 106, or data store 112 may store different data than is stored at server-based data store 106.

In at least one embodiment, data store 112 may be organized into one or more well-ordered data sets, with one or more data entries in each set. Data store 112, however, can have any suitable structure. Accordingly, the particular organization of data store 112 need not resemble the form in which information from data store 112 is displayed to user 100. In at least one embodiment, an identifying label is also stored along with each data entry, to be displayed along with each data entry.

Display screen 103 can be any element that displays information such as text and/or graphical elements. In particular, display screen 103 may display a user interface for presenting data concerning allocations, and/or for prompting the user to accept or reject such allocations. In at least one embodiment where only some of the desired output is presented at a time, a dynamic control, such as a scrolling mechanism, may be available via input device 102 to change which information is currently displayed, and/or to alter the manner in which the information is displayed.

Processor 104 can be a conventional microprocessor for performing operations on data under the direction of software, according to well-known techniques. Memory 105 can be random-access memory, having a structure and architecture as are known in the art, for use by processor 104 in the course of running software.

A communication device 107 may be used to enable communication with other computing devices (such as server 110) via network 109, using of any known wired and/or wireless protocol(s). For example, communication device 107 may be a network interface card ("NIC") capable of Ethernet communications and/or a wireless networking card capable of communicating wirelessly over any of the 802.11 standards. Communication device 107 may be capable of transmitting and/or receiving signals to transfer data, generate requests, receive responses, and/or initiate various processes within and/or outside client device 108.

In one embodiment, some or all of the components of the described system can be implemented as software written in any suitable computer programming language, whether in a standalone or client/server architecture. Alternatively, it may be implemented and/or embedded in hardware. As mentioned herein, in at least one embodiment, software running on client 108 can run APIs to communicate with other components, such as server 110.

Notably, as mentioned above, multiple servers 110 may be provided, Such servers 110 and/or multiple client devices 108 may be networked together, and each may have a structure similar to those of server 110 as described and depicted herein. The data structures and/or computing instructions used in the performance of methods described herein may be distributed among any number of client devices 108 and/or servers 110. As used herein, "system" may refer to any of the components, or any collection of components, from FIGS. 1A and/or 1B, and may include additional components not specifically described in connection with FIGS. 1A and 1B.

Figure 2:
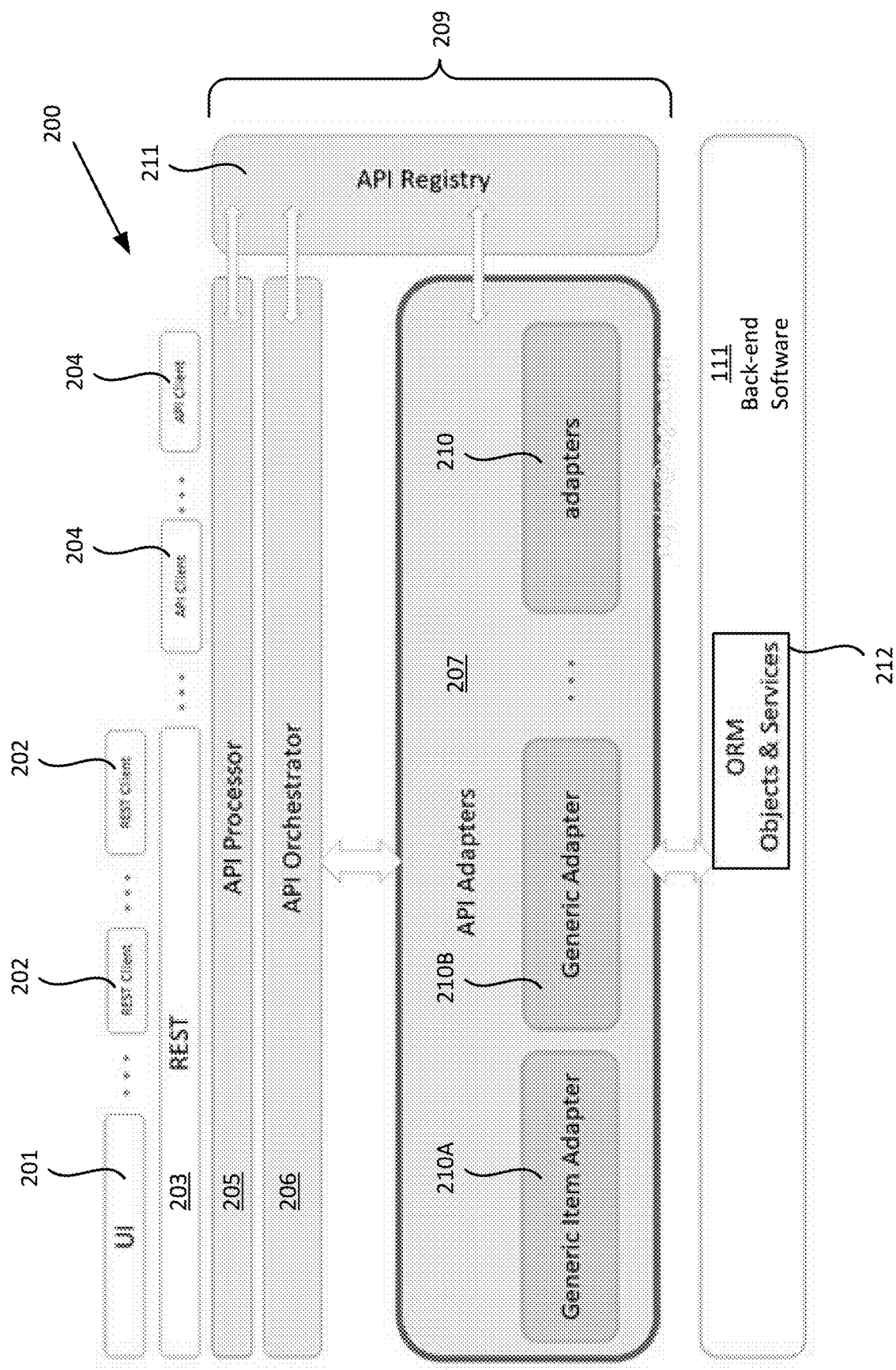
FIG. 2 is a block diagram depicting an overall software architecture including an API adapter layer with multiple adapters, according to one embodiment.

Referring now to FIG. 2, there is shown a block diagram depicting overall software architecture 200 including an API adapter layer 207 with multiple adapters 210, according to one embodiment. The software architecture shown in FIG. 2 may be implemented, for example, using a hardware architecture such as that shown in FIG. 1A, or any other suitable hardware architecture. The various components shown in FIG. 2 may be implemented in software running on the various components of a client/server architectures such as that shown in FIG. 1A, or any other suitable hardware architecture.

In at least one embodiment, software architecture 200 includes any number of Representational State (REST) clients 202, including for example, UI client 201; these may run, for example, on various client devices 108. Other types of clients 202 may include, for example, a third-party API service such as one that integrates multiple API services.

In at least one embodiment, REST layer 203 is provided as an intermediary between REST clients 202 (including UI client 201) and gateway 209; REST layer 203 may include any number of API clients 204, which represent APIs running at client devices 108 that may be consuming an API service via different service-oriented architecture (SOA) products. However, such an architecture is merely exemplary; one skilled in the art will recognize that many other architectures and arrangements can be used.

In at least one embodiment, gateway 209 is a software layer that receives requests from API clients 204 and passes such requests to back-end software 111 running on server 110. Gateway 209 may include, for example, API processor 205, API orchestrator 206, API adapter layer 207, and an API registry 211. However, the particular arrangement depicted in FIG. 2 is presented for illustrative purposes, and one skilled in the art will recognize that other arrangements are possible.

In the depicted arrangement, API processor 205 handles requests from REST clients 202, which are generally submitted by API clients 204. API orchestrator 206 may optionally be included, to integrate and/or otherwise prepare requests before they are sent for handling by server resources. In at least one embodiment, API adapter layer 207 provides functionality to transform requests and responses, including requests received from clients 202 running various older versions of external requests, and responses generated by a single version of back-end software 111 running on server 110. In at least one embodiment, API adapter layer 207 may also perform other functions, such as for example version-related validation, to ensure that an object operation is supported for the version that client 202 has requested, and that the body of the request body is compliant with the API schema of the version requested by client 202.

In at least one embodiment, API adapter layer 207 includes any number of adapters 210 (including, for example, generic item adapter 210A, generic adapter 210B, and/or the like); as described in more detail below, such adapters can allow older versions of client software to interact with a current version of the back-end. As described below, adapters 210 can be standalone or chained. Any or all of API processor 205, API orchestrator 206, and API adapter layer 207 may use resources from API registry 211 as needed to perform their functions. For example, API adapter layer 207 may initiate adapter instances with a required global context before invoking an operation method; such adapter instances can be based on object versions provided by API registry 211.

In at least one embodiment, API registry 211 may include details of various object versions, and, when requested, can return an adapter 210 that supports a particular object version. In at least one embodiment, API registry 211 can be implemented as a collection of metadata representing, for example, versioned object schemas. Adapters 210 load a corresponding versioned schema to validate whether the input is in an expected valid format before it converts the input into a target format. In at least one embodiment, an API registry factory (not shown) can be proved, which returns version-specific factories. Particular adapters can be implemented independent of any registry.

In invoking an adapter 210, an API can pass a request, for example as a PHP array, and pass a query "key" as an element in a GET request body. In at least one embodiment, appropriate authorization is performed prior to invoking an adapter 210.

Once requests have passed through adapter layer 207, they are transmitted to back-end software layer 111, which may run any suitable software for handling client requests. In at least one embodiment, software layer 111 includes Object-Relational Mapping (ORM) objects and/or services 212.

Responses received from software layer 111 pass through API adapter layer 207, API orchestrator 206, and API processor 205, to be passed back to API clients 204 and back to REST clients 202.

In at least one embodiment, responses are passed back to any one of clients 202 (such as, for example, UI client 201, which is one type of REST client 202). In at least one embodiment, a synchronous process mode is enabled, wherein a response is passed back to the client 202 that made the request. In another embodiment, an asynchronous process mode is enabled, wherein a response may be passed to any type of client 202 that is specified in the request, including a client 202 that may not be the same client 202 that made the request.

Adapters

In at least one embodiment, each adapter 210 may include object schema and registry definitions as may be used for validating and converting requests and responses. These can be generated at run-time by adapters 210, or they can be created and reviewed at design time. In at least one embodiment, customized object and field definitions may be incorporated into object definitions during runtime.

In at least one embodiment, generic adapter 210B can be provided, which invokes back-end operation base methods based on received API-formatted requests. Generic adapter 210B can be used for most objects until new version is introduced. In at least one embodiment, generic adapter 201B can be the last adapter 210 in a chained series of adapters 210.

In at least one embodiment, generic functionalities such as authorization, validation, conversion, and the like, can be provided as common API utilities. Other functionality such as Create, Update, Delete, Get, and Query can also be provided.

In at least one embodiment, various helper functions can be provided, to perform various tasks when called upon by adapters 210. Helper functions can include, for example
  authentication: to authenticate requests based on the API version, operation, and the like;
  conversion: to perform format conversion and field mapping;
  metadata retrieval: to retrieve metadata required for an adapter based on a given API version; and
  schema validation: to validate requests and responses according to the API definition.

FIGS. 3A through 3F depict various examples of configurations for operation of the system, wherein client devices 108, which may be running various versions of client 202, interact with a single version of back-end software 111 running on server 110. Clients 202 may include, for example REST clients 202 that follow a REST protocol when communicating with API processor 205. In at least one embodiment, the operation of adapter layer 207 is independent of the particular protocols used to enable communication among clients 202, API clients 204, API processor 205, API orchestrator 206, and adapter layer 207.

Figure 3A:
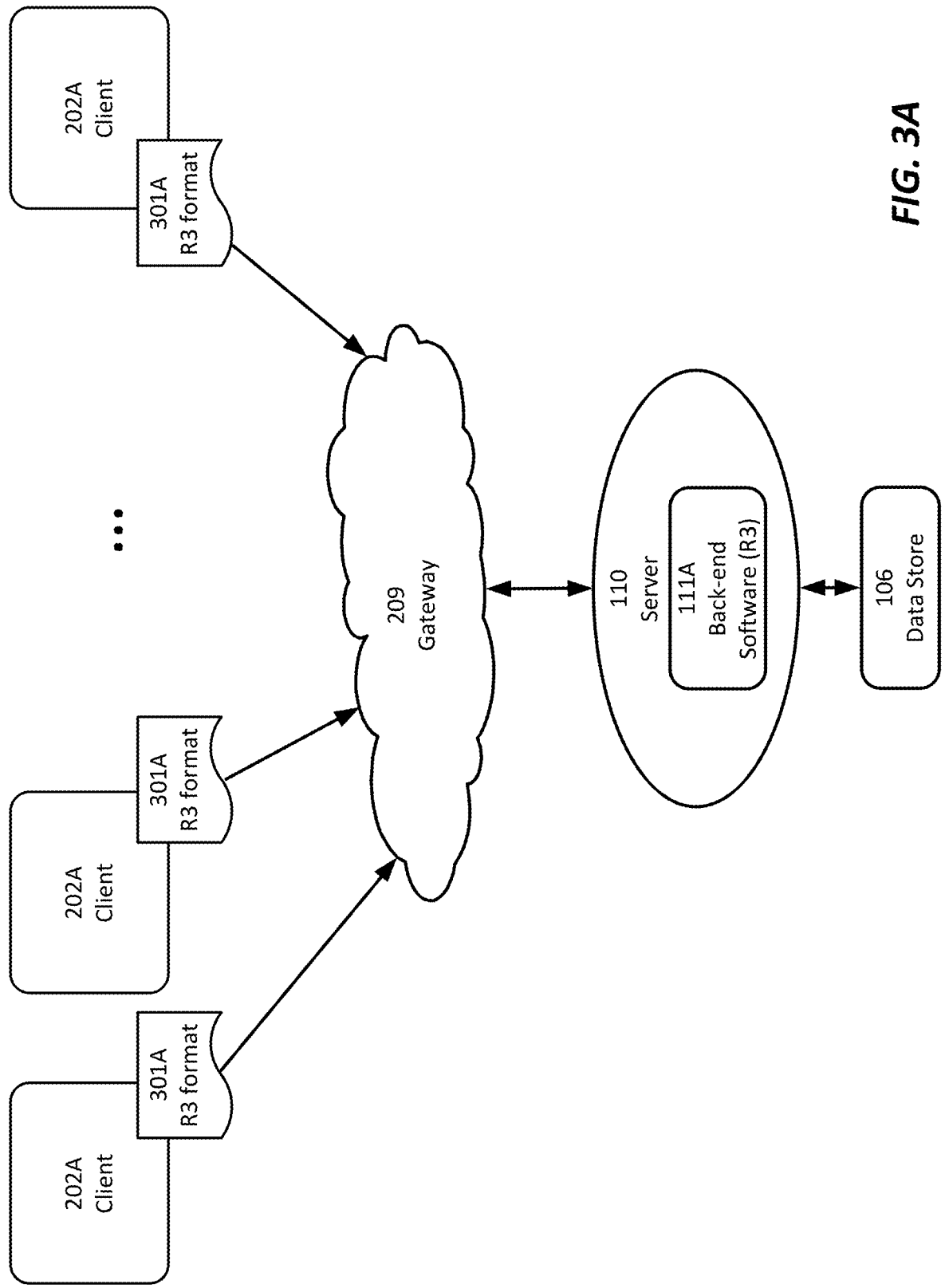
FIG. 3A is a block diagram depicting an example in which a plurality of clients running the same API version are interacting with a single back-end code base.

In the example of FIG. 3A, several clients 202A, which may each run on a different client device 108, are interacting with back-end software 111A, running at server 110. For illustrative purposes, all clients 202A are running the same API version, denoted as version R3, and back-end software 111A is similarly denoted as version R3. Since back-end software 111A and all clients 202A are the same version, there is no need for an adapter between clients 202A and back-end software 111A. Accordingly, in FIG. 3A, gateway 209 is shown as providing a direct connection between clients 202A and back-end software 111A, with no adapter layer.

Figure 3B:
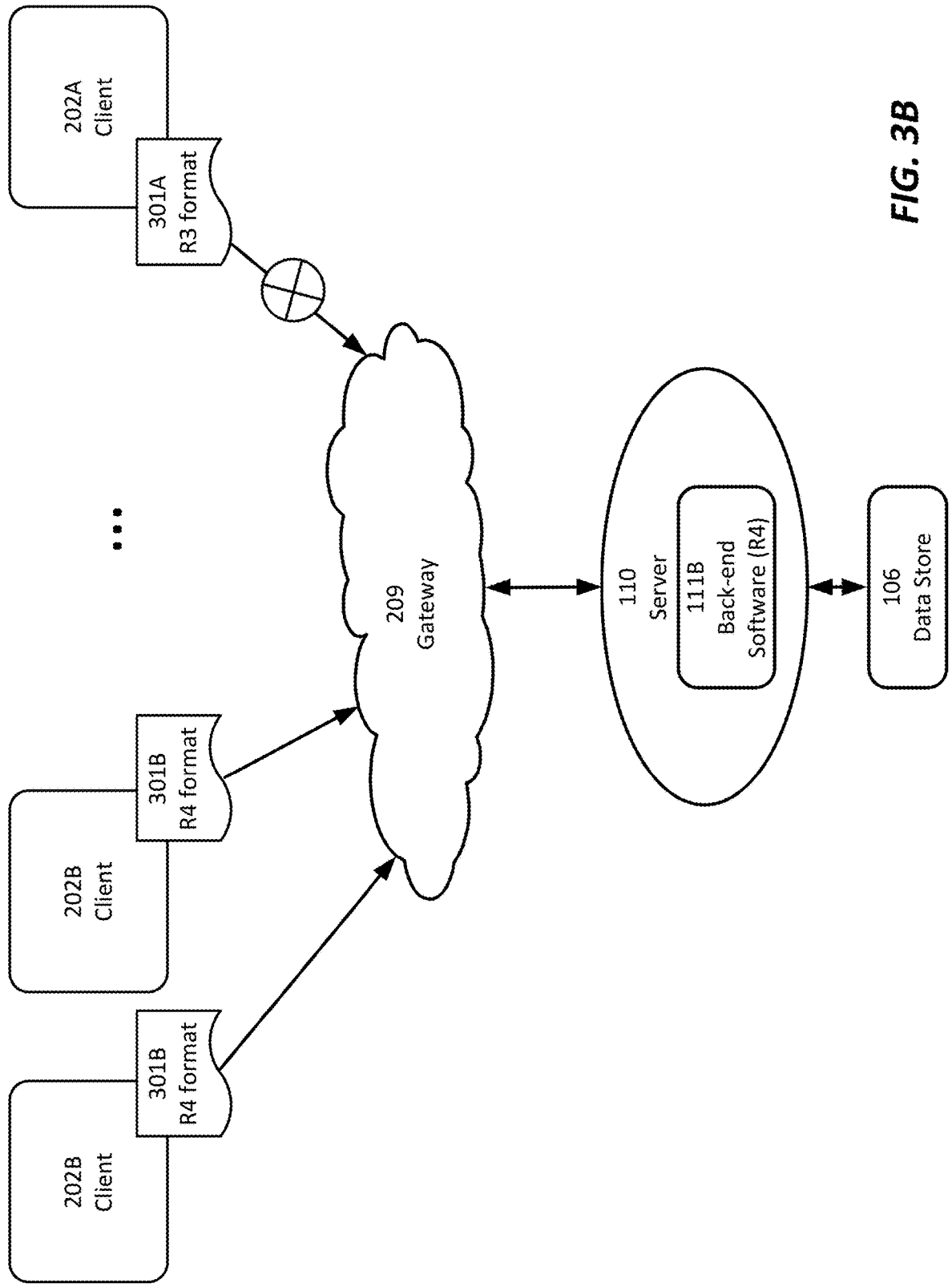
FIG. 3B is a block diagram depicting an example in which a plurality of clients running different API versions are attempting to interact with a single back-end code base.

In the example of FIG. 3B, back-end software 111B has been upgraded to version R4. Clients 202B have been updated to API version R4. However, one client 202A has not been updated, and is still running API version R3. Clients 202B therefore generate requests in R4 format 301B, while client 202A generates requests in R3 format 301A. As a result, in the example of FIG. 3B, in the absence of an adapter between clients 202A, 202B and back-end software 111B, client 202A is unable to function properly, as its requests to back-end software 111B will not be understood.

Figure 3C:
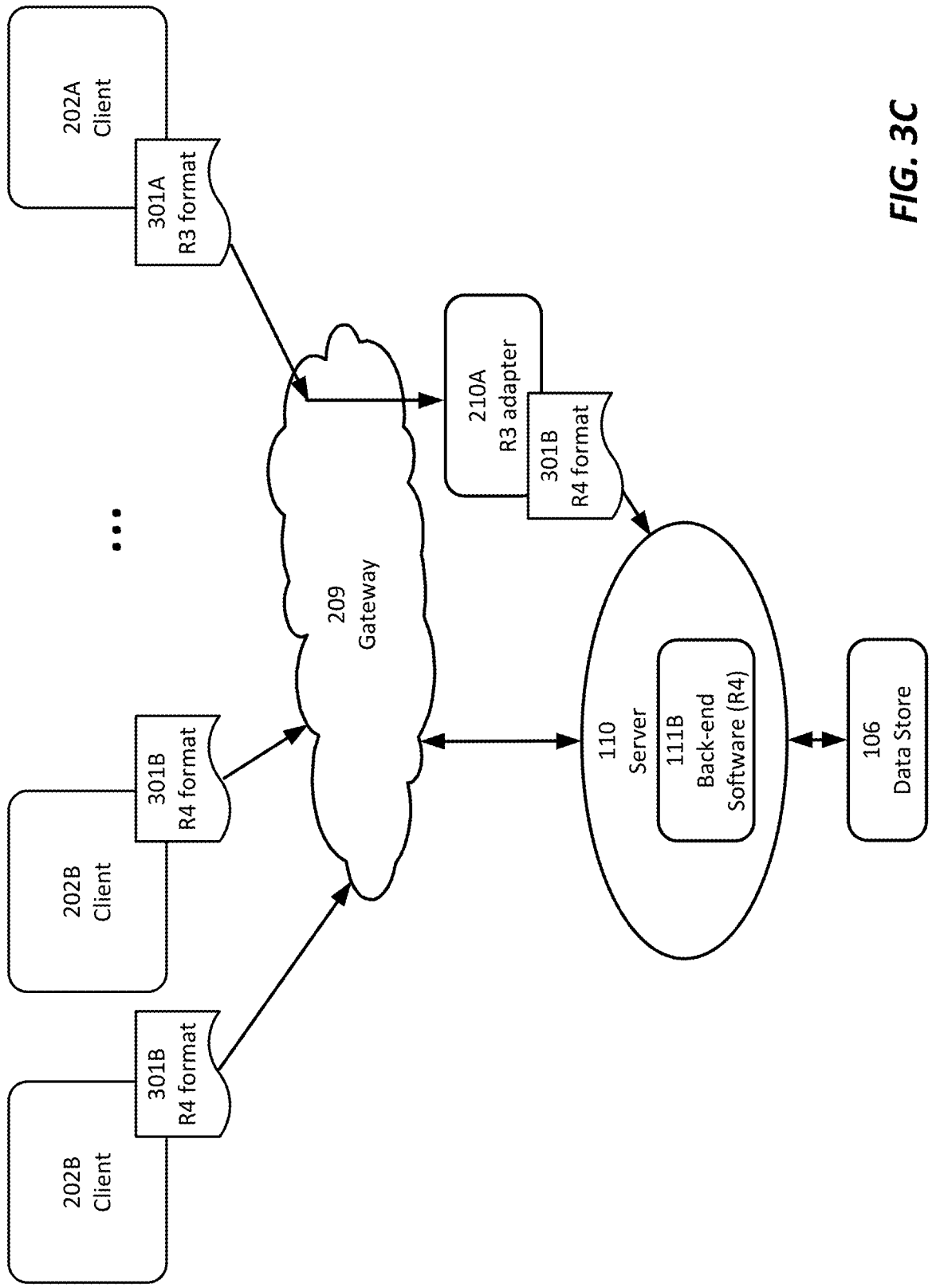
FIG. 3C is a block diagram depicting an example in which an adapter is provided to allow a client running an older version of an API to interact with a back-end code base.

The example of FIG. 3C presents a similar arrangement as that of FIG. 3B. However, in FIG. 3C, adapter 210A is provided. Adapter 210A transforms requests received from version R3 clients (such as client 202A) from R3 format 301A into R4 format 301B that is understandable by version R4 of back-end software 111B. Similarly, adapter 210A transforms responses from version R4 of back-end software 111B from R4 format 301B into R3 format 301A that is understandable by version R3 clients (such as client 202A). In this manner, adapter 210A allows version R3 clients (such as clients 202A) to continue to operate with back-end software 111B even after back-end software 111B has been updated to version R4.

Figure 3D:
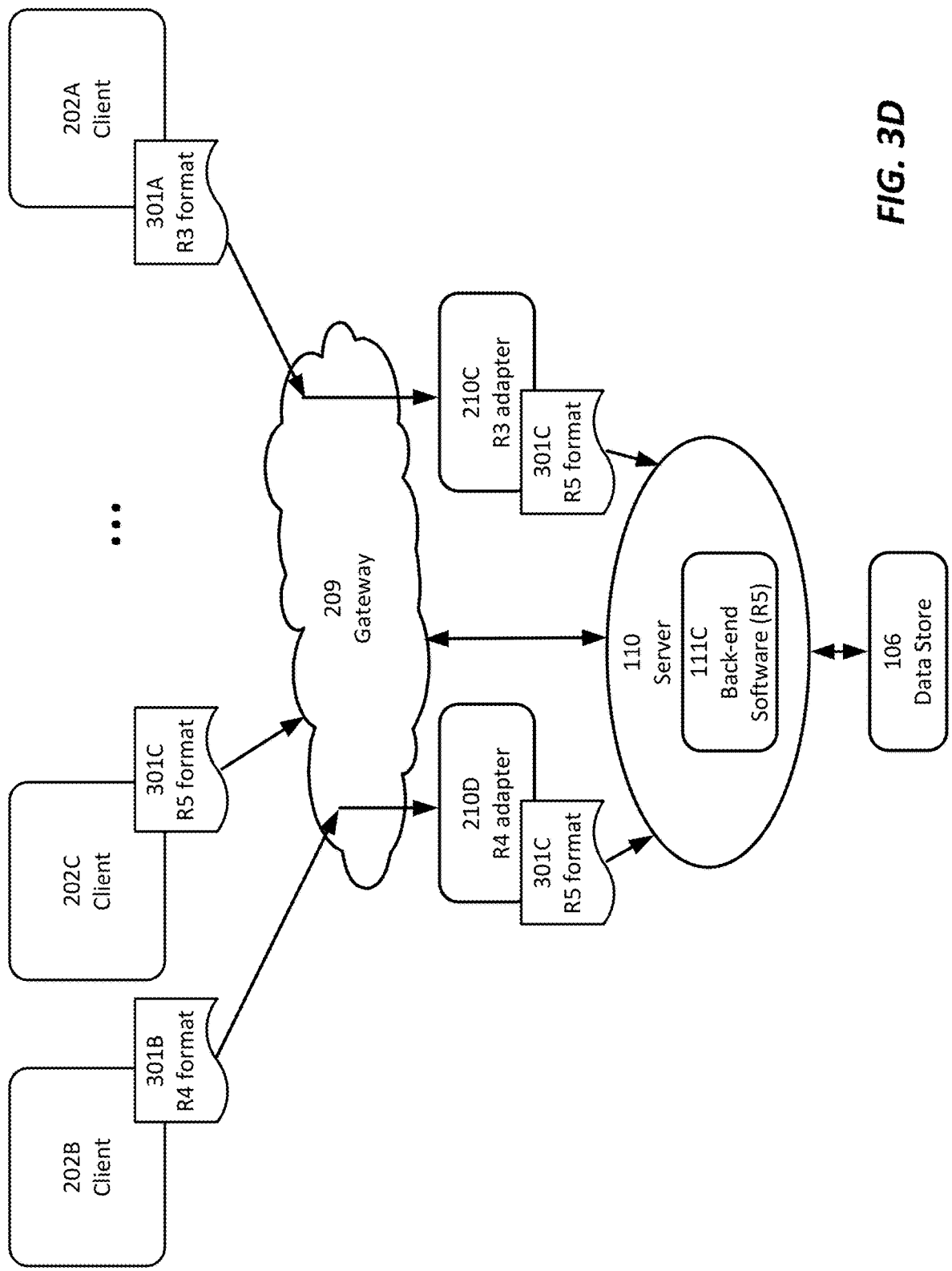
FIG. 3D is a block diagram depicting an example in which two different standalone adapters are provided to allow clients running two different older versions of an API to interact with a back-end code base.

FIG. 3D depicts an example wherein multiple older API versions are extant. Here, back-end software 111C is running API version R5, and expects requests to be in R5 format 301C. However, in this example, different clients 202 are running different API versions: client 202A is running API version R3, client 202B is running API version R4, and client 202C is running API version R5.

In the example of FIG. 3D, two standalone adapters 210C, 210D are provided. Adapter 210C transforms requests received from version R3 clients (such as client 202A) from R3 format 301A into R5 format 301C that is understandable by version R5 of back-end software 111C, and also transforms responses from version R5 of back-end software 111C from R5 format 301C into R3 format 301A that is understandable by version R3 clients (such as client 202A). Similarly, adapter 210D transforms requests received from version R4 clients (such as client 202B) from R4 format 301B into R5 format 301C that is understandable by version R5 of back-end software 111C, and also transforms responses from version R5 of back-end software 111C from R5 format 301C into R4 format 301B that is understandable by version R4 clients (such as client 202B). Requests from R5 client 202C are already in R5 format, and need not be transformed by any adapter.

One disadvantage of the approach shown in FIG. 3D is that adapters 210 need to be provided for each extant API version, and all such adapters 210 must directly transform requests and responses between the various API versions and the format 301 expected by version R5 of back-end software 111C. In addition, the approach shown in FIG. 3D requires that, each time back-end software 111 is updated to a new version, all adapters 210 must be updated to properly transform requests and responses from/to the various extant API versions running on clients 202.

Figure 3E:
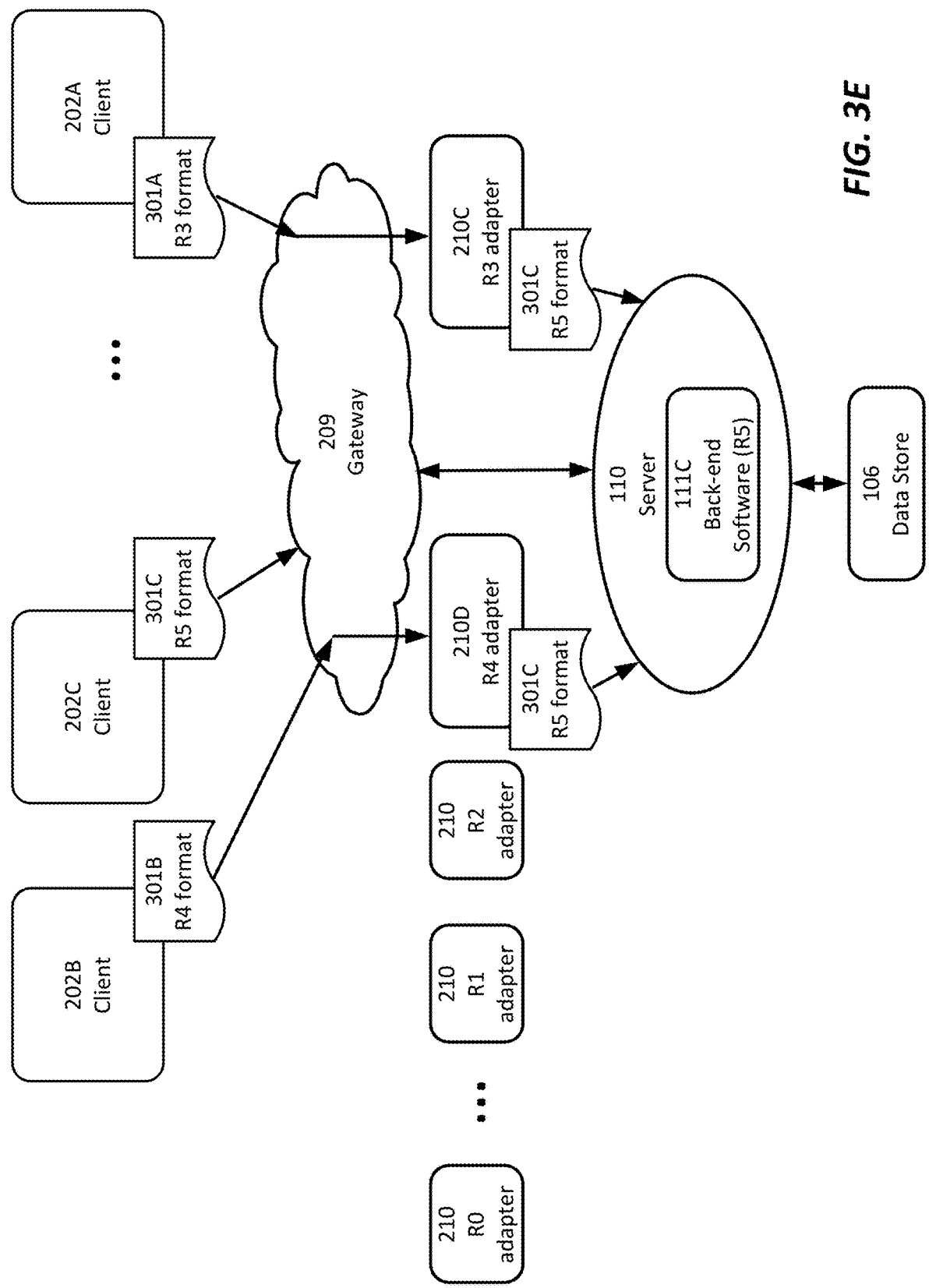
FIG. 3E is a block diagram depicting an example in which several different standalone adapters are provided to allow clients running various older versions of an API to interact with a back-end code base.

FIG. 3E depicts an example similar to that of FIG. 3D, wherein multiple additional adapters 210 are provided, for allowing connectivity with various different API versions running on clients 202. Any number of such adapters 210 can be provided, depending on how many API versions are extant. Accordingly, the task of updating all adapters 210 whenever back-end software 111 is updated to a new version can be difficult and expensive.

Figure 3F:
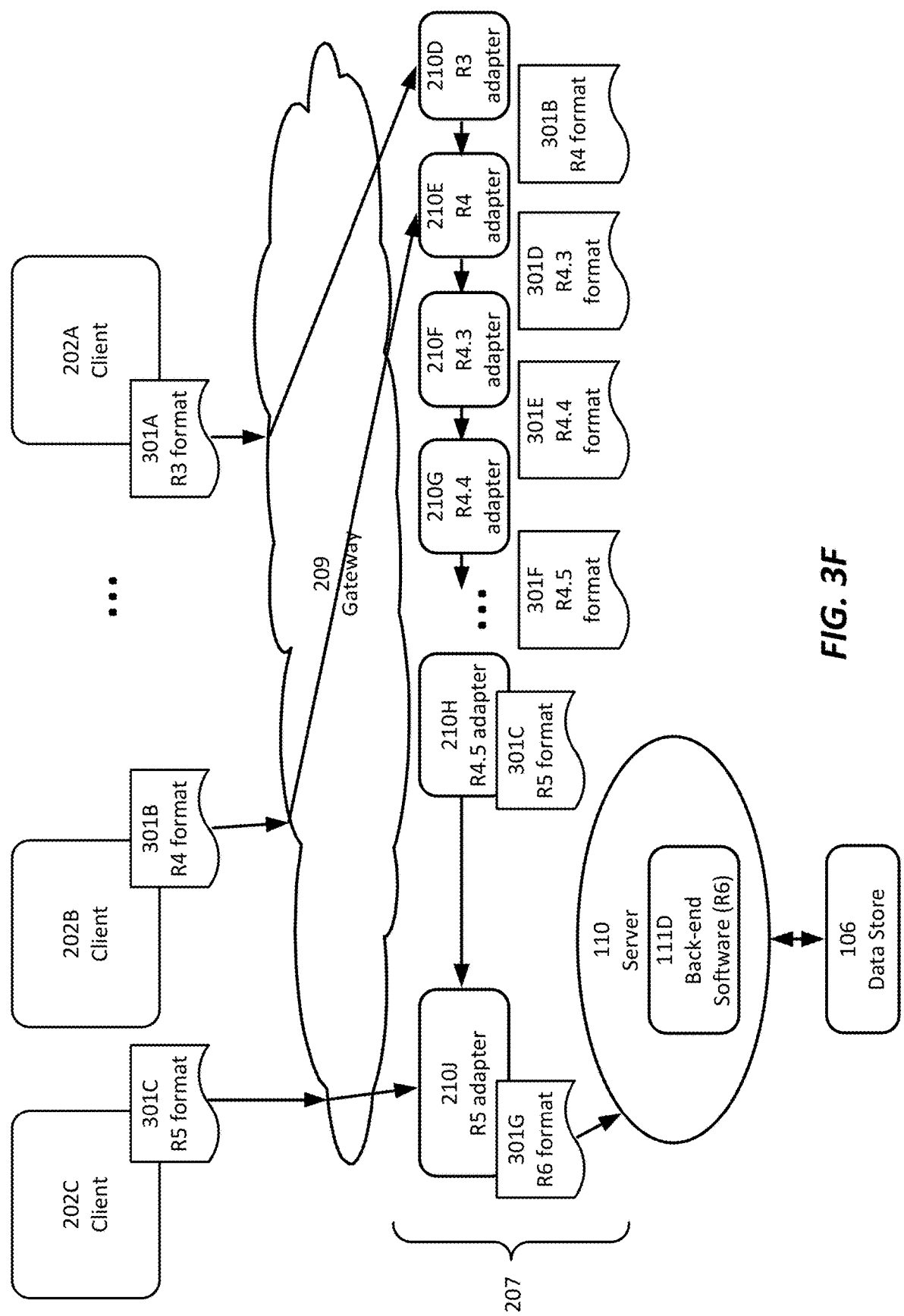
FIG. 3F is a block diagram depicting an example including a chained adapter layer, in which adapters are designed to chain with one another to allow clients running various older software versions to interact with a back-end code base.

FIG. 3F depicts an example that includes chained adapter layer 207, in which adapters 210 are designed to chain with one another to allow clients 202 running various older API versions to interact with back-end software 111. Here, back-end software 111D is running API version R6, and expects requests to be in R6 format 301G. Several different clients 202 are depicted, each running different API versions: client 202A is running API version R3, client 202B is running API version R4, and client 202C is running API version R5.

Chained adapter layer 207 includes various chained adapters 210, including:
  R3 adapter 210D, which transforms requests from R3 format 301A to R4 format 301B, and vice versa;
  R4 adapter 210E, which transforms requests from R4 format 301B to R4.3 format 301D, and vice versa;
  R4.3 adapter 210F, which transforms requests from R4.3 format 301D to R4.4 format 301E, and vice versa;
  R4.4 adapter 210G, which transforms requests from R4.4 format 301E to R4.5 format 301F, and vice versa;
  R4.5 adapter 210H, which transforms requests from R4.5 format 301F to R5 format 301C, and vice versa; and
  R5 adapter 210J, which transforms requests from R5 format 301C to R6 format 301G, and vice versa.

The various adapters 210 are arranged and configured so that each adapter 210 is able to receive requests from either a client 202 running a particular API version, or from another adapter 210. Adapters 210 are further configured to pass transformed requests either to back-end software 111 or to another adapter 210. Similarly, adapters 210 are arranged and configured so that each adapter 210 is able to receive responses from back-end software 111 or from another adapter 210. Adapters 210 are further configured to pass transformed responses either to a client 202 running a particular version of client software or to another adapter 210.

By using chained adapter layer 207, the system is able to provide an arrangement wherein adapters 210 rely on one another to transform requests and responses in various formats 301 to/from the format 301 expected by back-end software 111. In this manner, back-end software 111 can run a single version of the logic required to service client requests, and can still operate effectively with clients 202 running various API versions, including older versions and/or current versions.

Furthermore, by using chained adapter layer 207, the system provides an environment wherein, upon release of a new version of back-end software 111, only a single new adapter 210 need be created. The new adapter 210 can be configured to transform requests and responses between the current format 301 (as expected by the new version of back-end software 111) and the immediately preceding or succeeding format. The depicted arrangement thus avoids the need to update multiple adapters 210 to be able to transform requests and responses to/from clients 202 running various API versions. Rather, new adapter 210 can be configured so that it receives requests either from the immediately preceding adapter 210 and/or clients 202 running the immediately preceding API version, and transforms such requests to current format 301 (and vice versa). No changes need be made to any other, already existing adapters 210.

In various embodiments, adapters 210 in any of these architectures and arrangements can be implemented using any suitable techniques for transforming requests and responses so that they can be received and understood by different versions of back-end software 111, clients 202, APIs, and/or other adapters 210. For example, in at least one embodiment, at least one adapter 210 may include logic to transform requests and/or responses between a previous released API interface and the latest deployed production code base for back-end software 111. Such an adapter 210 is therefore able to understand requests that are formatted according to an older API, return responses that can be understood by clients 202 using the older API, and transform requests and responses between current and older versions.

In various embodiments, in transforming requests and responses, adapter 210 can change any or all of the following, depending on the particular differences between current and older versions of the API:
  Interface (such as naming and mapping);
  Field types, values, and requirements;
  Behavior logic and conditions;
  Error criteria and messages;
  And/or the like.

Adapters 210 can perform any of a number of functions to transform requests and responses from one version to another. Examples of changes that may be addressed by an adapter 210 include:
  Introduction of a new field, whether mandatory or not;
  Format change to a field;
  Deletion of a field; and
  Behavior changes.

In at least one embodiment, when a mandatory field is added, adapter 210 can generate a default value of the new field when the field value is missing.

As an example, suppose there are four versions of back-end software 111 corresponding to different releases. These may be denoted V1, V2, V3, and V4. Changes are as follows:
  From V1 to V2:
  Added new field "status" with valid values ["on", "off"] (default "on").
    Since application will assume status to be on, no adapter is needed.
  Added new audit fields.
    Field has system generated values, and no adapter is needed.
  Therefore, no new adapter is needed. A generic adapter 210B can be used.
  From V2 to V3:
  Changed "status" values to ["active", "inactive"] (default "active")
  A new adapter is provided to map field values. The adapter maps V1 and V2 payload (on/off) to V3 format (active/inactive) before passing the request to/from back-end software 111. V3 payload is the latest version and is compliant with the latest code base; therefore generic adapter 210E is sufficient. The adapter can be chained with generic adapter 210B, as described in more detail below.
  From V3 to V4:

Added non-required new reference field(s) (default "null")

Since the new reference is not required, no new adapter is needed.

Method

Figure 4A:
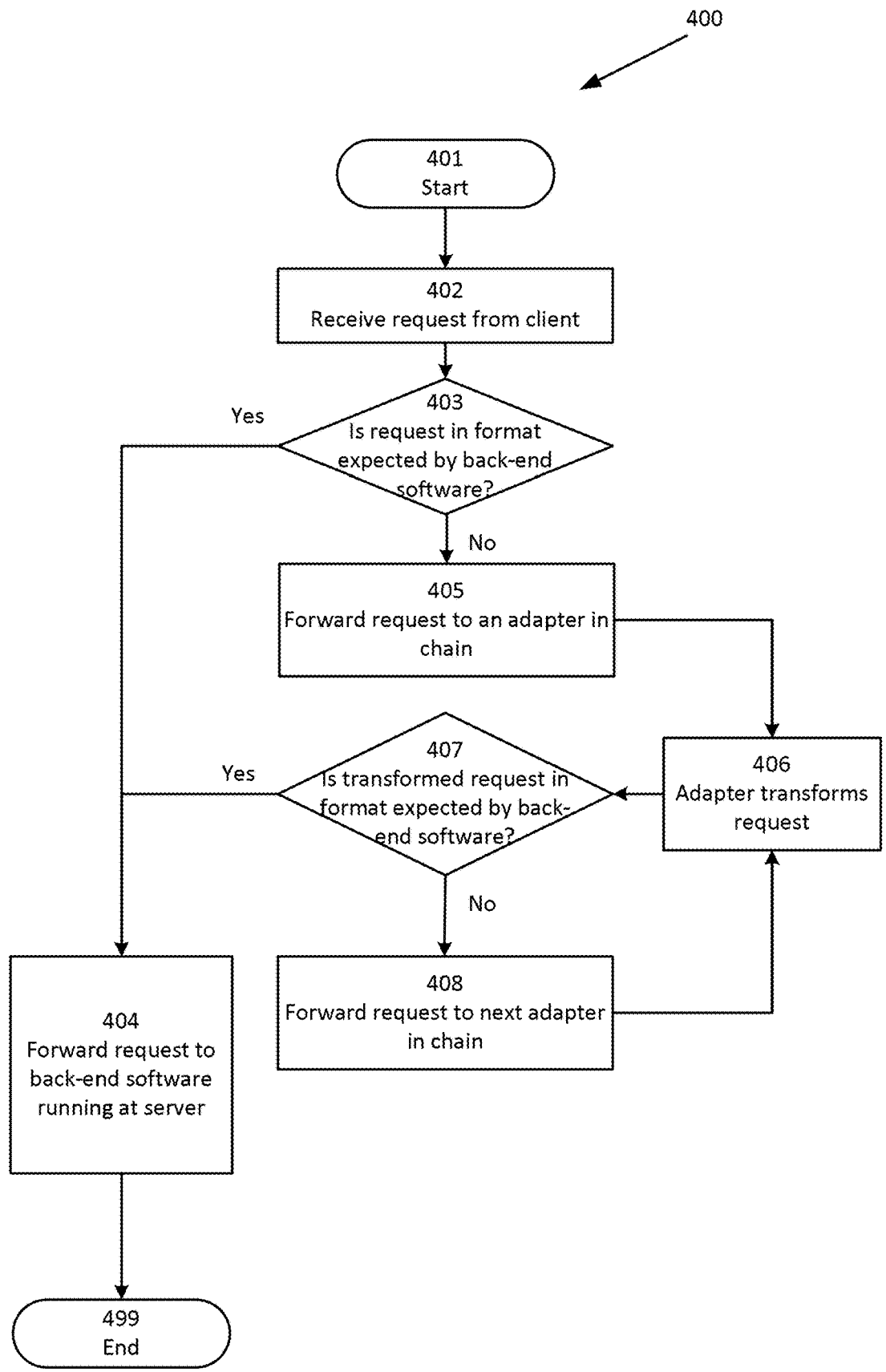
FIG. 4A is a flow diagram depicting a method of using a chained adapter layer to transform client requests to a format expected by back-end software, according to one embodiment.

Referring now to FIG. 4A, there is shown a flow diagram depicting a method 400 of using chained adapter layer 207 to transform client requests to a format expected by back-end software, according to one embodiment. In at least one embodiment, method 400 can be implemented using a hardware architecture as depicted in FIG. 1A, and using an arrangement of chained adapters 210 as depicted in the example of FIG. 3F. However, one skilled in the art will recognize that method 400 can be implemented using other architectures and arrangements. Method 400 can be used with any number of chained adapters 210, configured in any suitable arrangement.

Method 400 begins 401. A request is received 402 from client 202 running an API. The request may be received, for example, by chained adapter layer 207. In at least one embodiment, the request may pass through API processor 205, API orchestrator 206, and/or any other components before it is received by chained adapter layer 207.

A determination is made 403 as to whether the received request is in current format 301 as expected by back-end software 111 running at server 110. If so, the request is forwarded 404 to back-end software 111 running at server 110, and method 400 ends 499.

If, in step 403, it is determined that the received request is not in the current format 301 as expected by back-end software 111 running at server 110, the request is forwarded 405 to an adapter 210 in chained adapter layer 207. More particularly, the request is forwarded 405 to an adapter 210 that is designed to accept requests in the format 301 of the received request. This adapter 210 transforms 406 the request. A determination is made 407 as to whether the transformed request is in the current format 301 as expected by the back-end software 111 running at server 110. If so, the request is forwarded 404 to back-end software 111 running at server 110, and method 400 ends 499.

If, in step 407, it is determined that the transformed request is not in the current format 301 as expected by back-end software 111 running at server 110, the request is forwarded 408 to the next adapter 210 in chained adapter layer 207, and the method returns to step 406. In this manner, steps 406 through 408 are performed iteratively until the transformed request is in the current format 301 expected by back-end software 111.

Figure 4B:
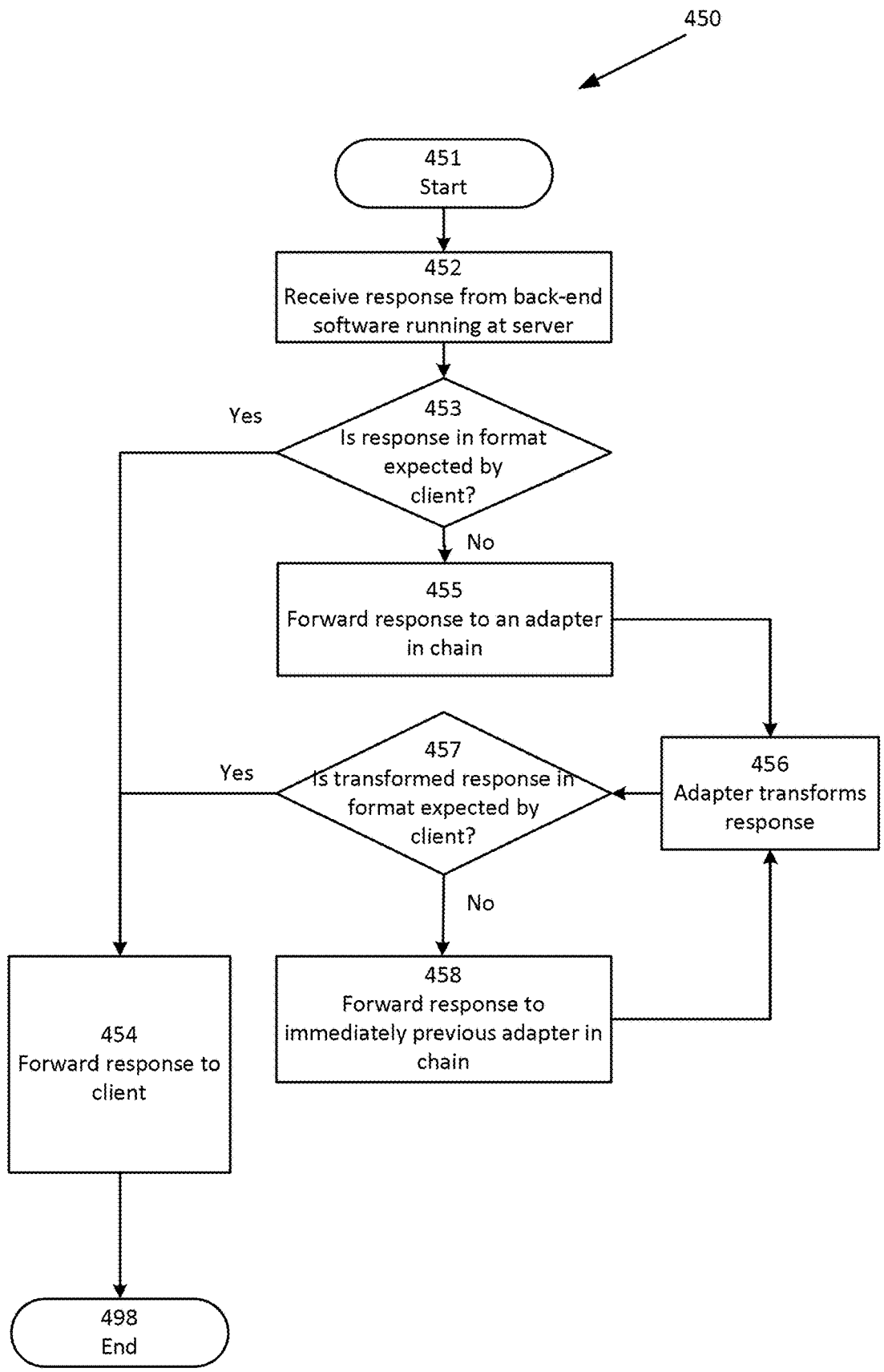
FIG. 4B is a flow diagram depicting a method of using a chained adapter layer to transform responses from a format provided by back-end software to a format expected by a client, according to one embodiment.

Referring now to FIG. 4B, there is shown a flow diagram depicting a method 450 of using chained adapter layer 207 to transform responses from a format provided by back-end software 111 to a format expected by client 202 that made the request, according to one embodiment. In at least one embodiment, method 450 can be implemented using a hardware architecture as depicted in FIG. 1A, and using an arrangement of chained adapters 210 as depicted in the example of FIG. 3F. However, one skilled in the art will recognize that method 450 can be implemented using other hardware architectures and arrangements. Method 450 can be used with any number of chained adapters 210, configured in any suitable arrangement.

Method 450 begins 451. A response to a previous request is received 452 from back-end software 111 running at server 110. The response may be received, for example, by chained adapter layer 207.

A determination is made 453 as to whether the received response is in a format 301 expected by the client 202 that made the request. If so, the response is forwarded 454 to the client 202 that made the request, and method 450 ends 498.

If, in step 453, it is determined that the received response is not in a format 301 expected by the client 202, the response is forwarded 455 to an adapter 210 in chained adapter layer 207. More particularly, the response is forwarded 405 to an adapter 210 that is designed to accept responses in the format 301 of the received response. This adapter 210 transforms 456 the response. A determination is made 457 as to whether the transformed response is in the format 301 expected by the client 202. If so, the response is forwarded 454 to the client 202 that made the request, and method 450 ends 498.

If, in step 457, it is determined that the transformed response is not in the format 301 expected by the client 202, the response is forwarded 458 to the immediately previous adapter 210 in chained adapter layer 207, and the method returns to step 456. In this manner, steps 456 through 458 are performed iteratively until the transformed response is in the format 301 expected by the client 202 that made the request.

In at least one embodiment, when the response is forwarded to client 202 in step 454, the response may pass through API processor 205, API orchestrator 206, and/or any other components before it is received by client 202.

Figure 5A:
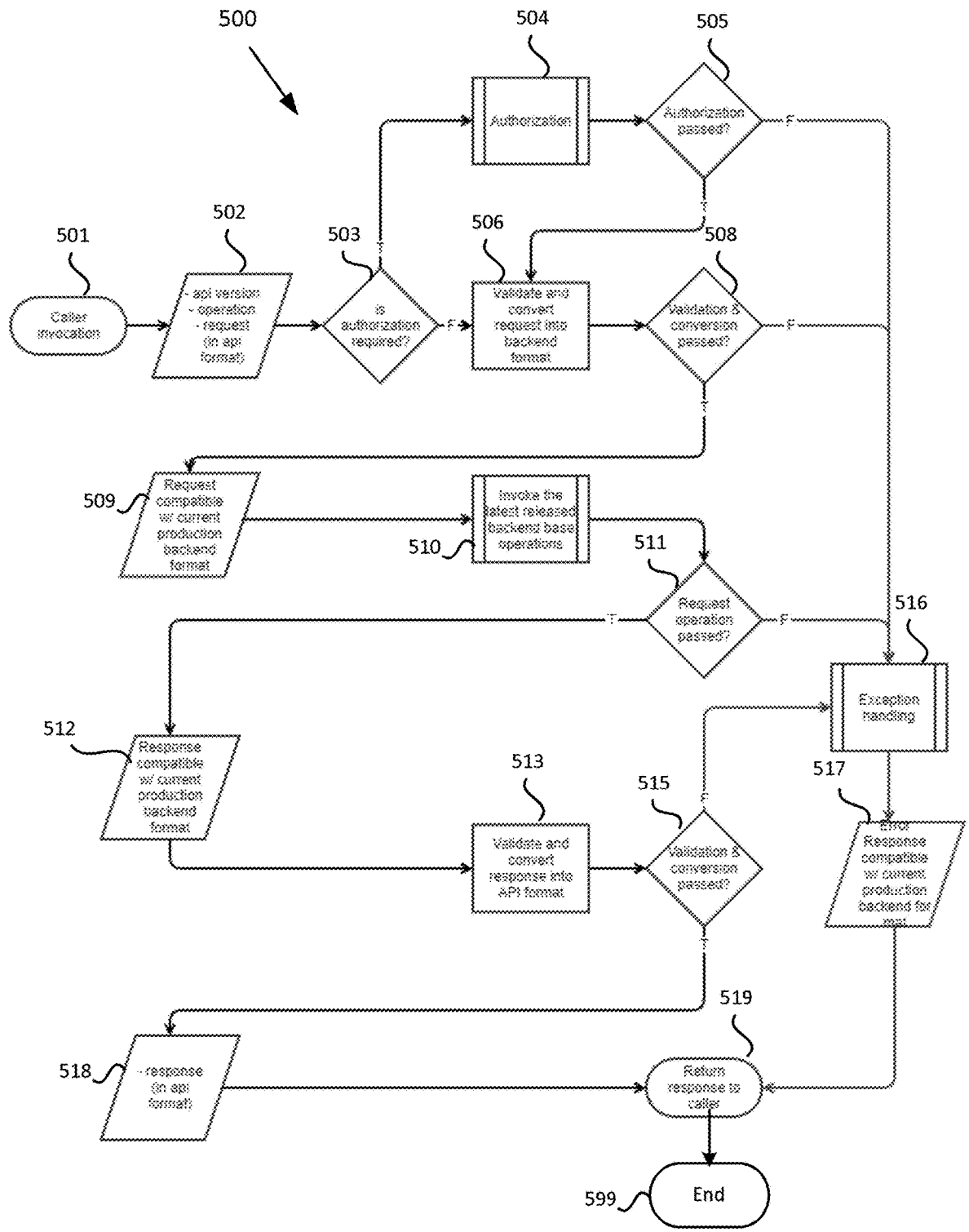
FIG. 5A is a flow diagram depicting an overall method of handling requests and responses, according to one embodiment.

Referring now to FIG. 5A, there is shown a flow diagram depicting an overall method 500 of handling requests and responses, according to one embodiment. A caller invokes 501 method 500, for example based on a received request 502 from a client 202. Request 502 may be in an older format, depending on which API version is running at the client 202 that generated it. Request 502 may specify various parameters such as, for example, the API version, an operation to be performed, and/or a request. A determination is made 503 as to whether authorization is required. If so, authorization is attempted 504 using any known technique. If the authorization does not pass 505, error handling is performed 516, and an error message is issued 517 based on the current production format. A response is returned 519 to the caller, and the method ends 599.

If, in step 505, the authorization passes, or if, in step 503, no authorization is required, the method proceeds to step 506, wherein the request is validated and converted into a format that will be understandable by back-end software 111. A determination is made 508 as to whether the validation and conversion passed. If not, error handling is performed 516, and an error message is issued 517 based on the current production format. A response is returned 519 to the caller, and the method ends 599.

If, in step 508, the validation and conversion passes, the result is request 509 that is compatible with the current format expected by back-end software 111. Request 509 is passed to back-end software 111, causing the appropriate code to be invoked so as to generate a response to request 509. A determination is made 511 as to whether request 509 has been successfully passed to (and understood by) back-end software 111. If not, error handling is performed 516, and an error message is issued 517 based on the current production format. A response is returned 519 to the caller, and the method ends 599.

If, in step 511, the request 509 is successfully passed to (and understood by) back-end software 111, back-end software 111 generates response 512 according to the current format. Response 512 is validated and converted 513 into a format expected by client 202 that made the request. A determination is made 515 as to whether the validation and conversion passed. If not, error handling is performed 516, and an error message is issued 517 based on the current production format. A response is returned 519 to the caller, and the method ends 599.

If, in step 515, the validation and conversion passes, the result is response 518 that is compatible with the format expected by client 202 that made the request. Response 518 is then returned 519 to client 202 that generated the request (i.e., the caller), and the method ends 599.

Figure 5B:
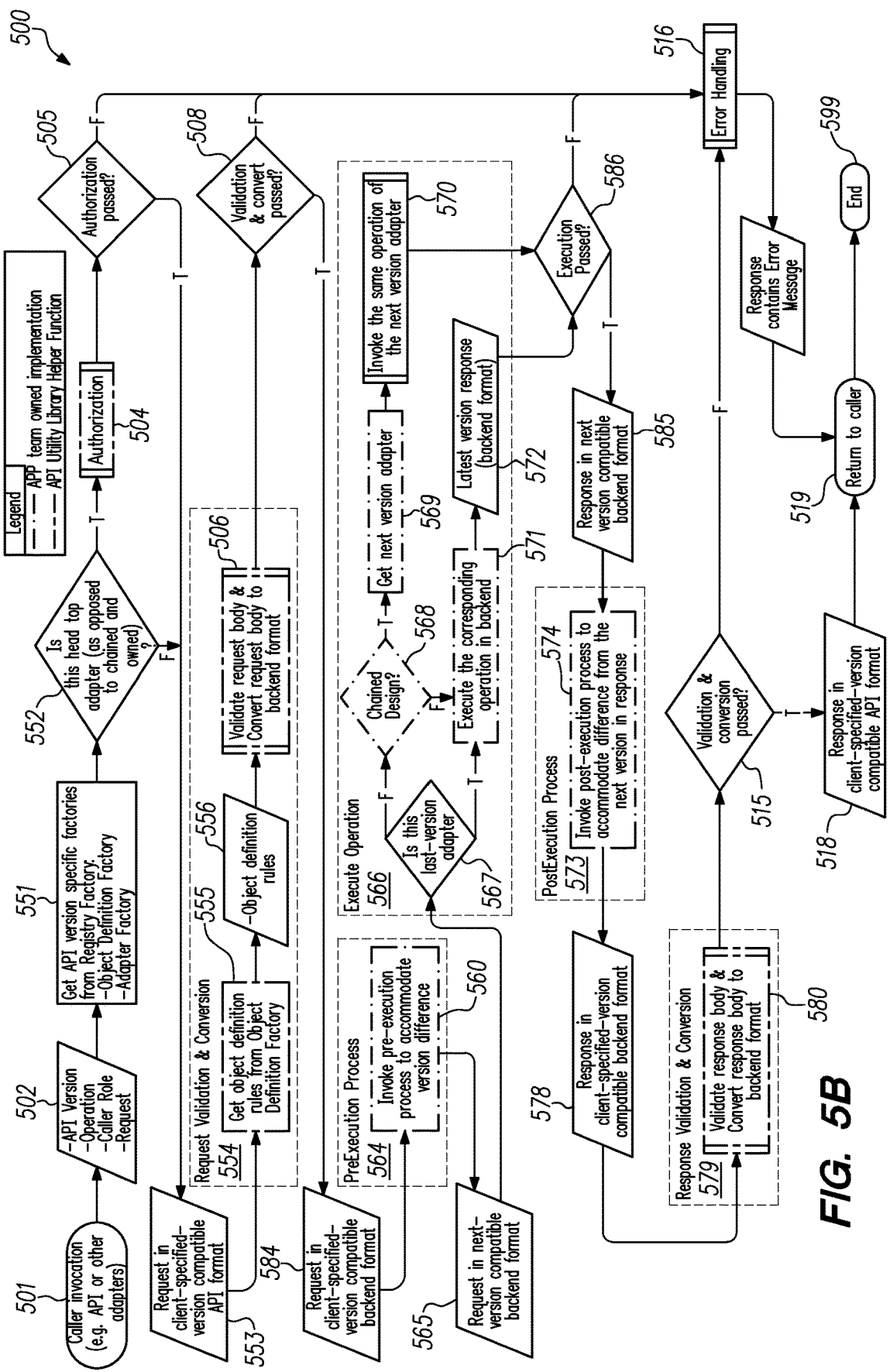
FIG. 5B is a flow diagram depicting, in more detail, a method of handling requests and responses, according to one embodiment.

Referring now to FIG. 5B, there is shown a flow diagram depicting more details of method 500 of handling requests and responses, according to one embodiment. A caller invokes 501 method 500, for example based on a received request 502 from a client 202. Factories specific to the API version of request 502 are then obtained 551, for example from a registry factory, including an object definition factory and an adapter factory. These will be used to generate or obtain the needed object definitions and adapters 210. A determination is made 552 as to whether the obtained adapter 210 is the head top adapter (meaning authorization is required), as opposed to a chained and owned adapter. If the obtained adapter 210 is the head top adapter, authorization is attempted 504 using any known technique. If the authorization does not pass 505, error handling is performed 516, and an error message is issued 517 based on the current production format. A response is returned 519 to the caller, and the method ends 599.

If, in step 505, the authorization passes, or if, in step 552, no authorization is needed, the method proceeds. Request 553 in a client-specified API format is provided for request validation and conversion process 554, which includes obtaining 555 object definition rules 556 from an object definition factory, and validating and converting 506 request 553 into back-end format. The method then proceeds to step 508, to determine whether the validation and conversion passed. If not, error handling is performed 516, and an error message is issued 517 based on the current production format. A response is returned 519 to the caller, and the method ends 599.

If, in step 508, the validation and conversion passes, the result is request 584 in a client-specified back-end format. Pre-execution process 564 is performed on request 584, to transform request 584 into the next-version back-end format. First, pre-execution process 564 is invoked 560. The result is request 585 in a next-version back-end format.

Execute operation 566 is then performed on request 585. This includes determining 567 if the applied adapter 210 has converted the request to the last version. If not, a determination is made 568 as to whether a chained adapter architecture is being used. If a chained adapter architecture is being used, the next version adapter 210 is obtained 569, and pre-execution process 564 is invoked 570 using the obtained next version adapter 210. The process is iterated until the last-version adapter 210 has been applied.

Once the last-version adapter has been applied, or if a standalone (non-chained) adapter architecture is being used, the request is passed to back-end software 111 and the appropriate operation is executed 571. Response 572, formatted according to the current version of back-end software 111, is received. A determination is made 586 as to whether execution was successful. If not, error handling is performed 516, and an error message is issued 517 based on the current production format. A response is returned 519 to the caller, and the method ends 599.

If, in step 586, execution was successful, the result is response 585 in the current version back-end format. Post-execution process 573 is performed on response 585, to transform response 585 into the version expected by client 202. First, post-execution process 573 is invoked 574. The result is response 578 in a back-end format compatible with the client-specified version.

Response validation and conversion operation 579 is then performed on response 578. First, the body of response 578 is validated 580 and converted to back-end format. The method proceeds to step 515, to determine whether the validation and conversion passed. If not, error handling is performed 516, and an error message is issued 517 based on the current production format. A response is returned 519 to the caller, and the method ends 599.

If, in step 515, the validation and conversion passes, the result is response 518 in a client-specified API format. Response 518 is returned 519 and sent to client 202. The method ends 599.

EXAMPLES

Figure 6:
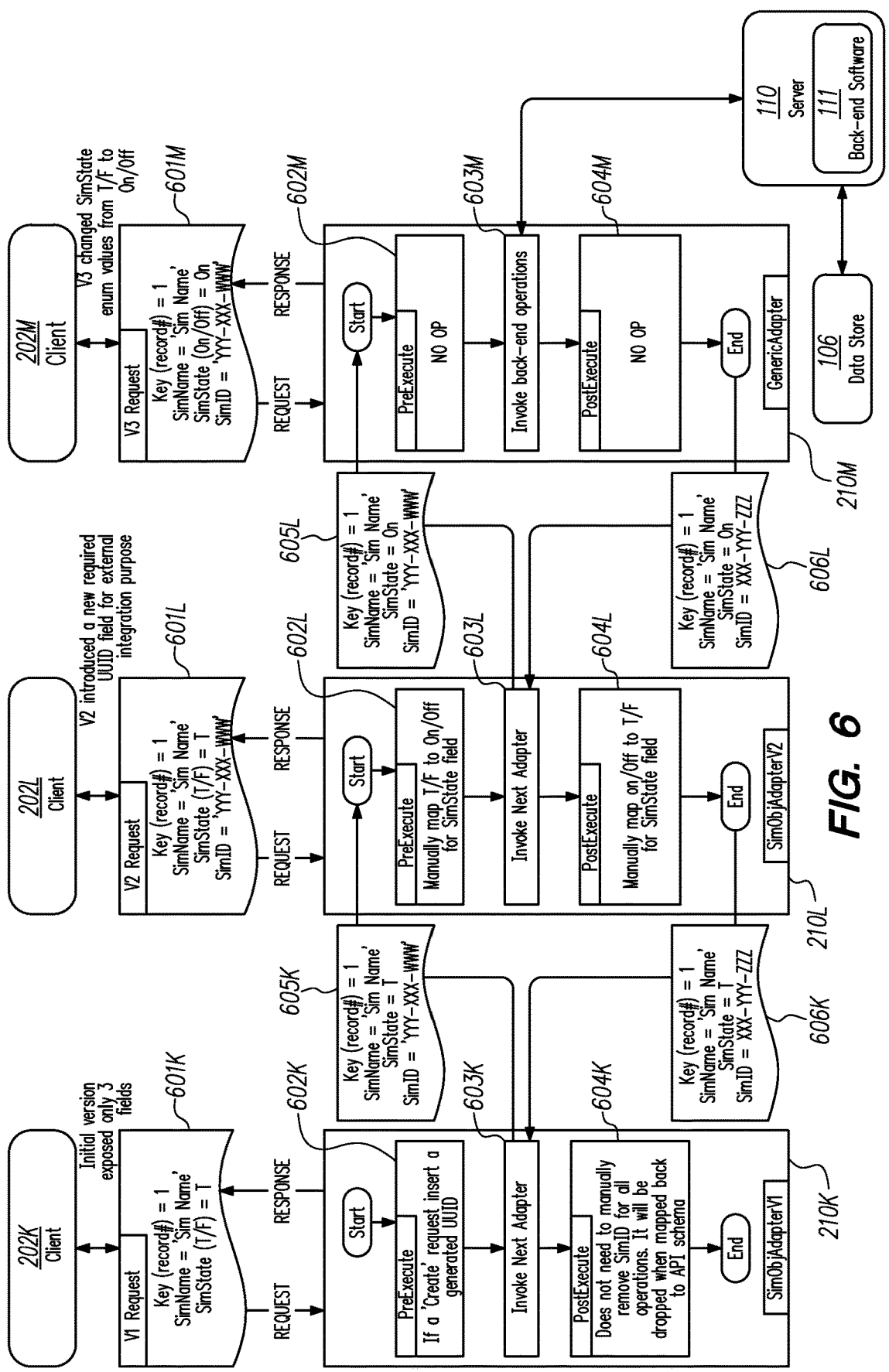
FIG. 6 is a flow diagram depicting an example of scenario in which an adapter layer with chained adapters passes a request to a server running a back-end code base, according to one embodiment.

Referring now to FIG. 6, there is shown a flow diagram depicting an example of scenario in which an adapter layer with chained adapters 210 passes a request to a server 110 running a back-end code base 111, according to one embodiment.

The example of FIG. 6 includes three adapters 210K, 210L, and 210M, arranged in a chained configuration. In this example, a first API version V1 defines a Sim object having three fields: key, SimName, and SimState. Subsequently, version V2 adds field SimID. Version V3 then changes SimState from T/F to On/Off. The techniques described herein enables processing of requests received from clients 202 running older versions, by first transforming such requests to a format expected by software 111 running at server 110, and by transforming responses issued by software 111 running at server 110 into a format expected by clients 202.

For example, request 601K received from client 202K is in V1 format. Adapter 210K performs pre-execute step 602K to transform request 601K into V2 format, by inserting a generated value for SimID. Adapter 210K then invokes 603K adapter 210L, passing transformed request 605K which now includes SimID.

Adapter 210L performs pre-execute step 602L to transform request 601L into V3 format, by mapping T/F to On/Off for the SimState field. Adapter 210L then invokes 603L adapter 210M, passing transformed request 605L which now includes an On value (instead of a T value) for the SimState field.

Generic adapter 210M contains no operation for its pre-execute step 602M. Generic adapter 210M invokes 603M back-end operations by passing request 605L to server 110 for processing by back-end software 111. Generic adapter 210M receives response 606L, and passes it to adapter 210L. Generic adapter 210M contains no operation for its post-execute step 604M.

Adapter 210L performs post-execute step 604L to transform response 606L into V2 format, by mapping On/Off to T/F for the SimState field, and passes transformed response 606K to adapter 210K.

Adapter 210K performs post-execute step 604K to transform response 606K into V1 format. In this example, SimID does not need to be manually removed for all operations, but rather is dropped when response 601K is mapped to the API schema for transmission to client 202K.

Similar operations can be performed on requests from client 202L, although omitting adapter 202K. Similar operations can be performed on requests from client 202M, although omitting adapters 202K and 202L.

Referring now to FIGS. 7A through 7D, there are shown block diagrams depicting examples of an adapter layer 207 including standalone adapters 202, according to one embodiment.

Figure 7A:
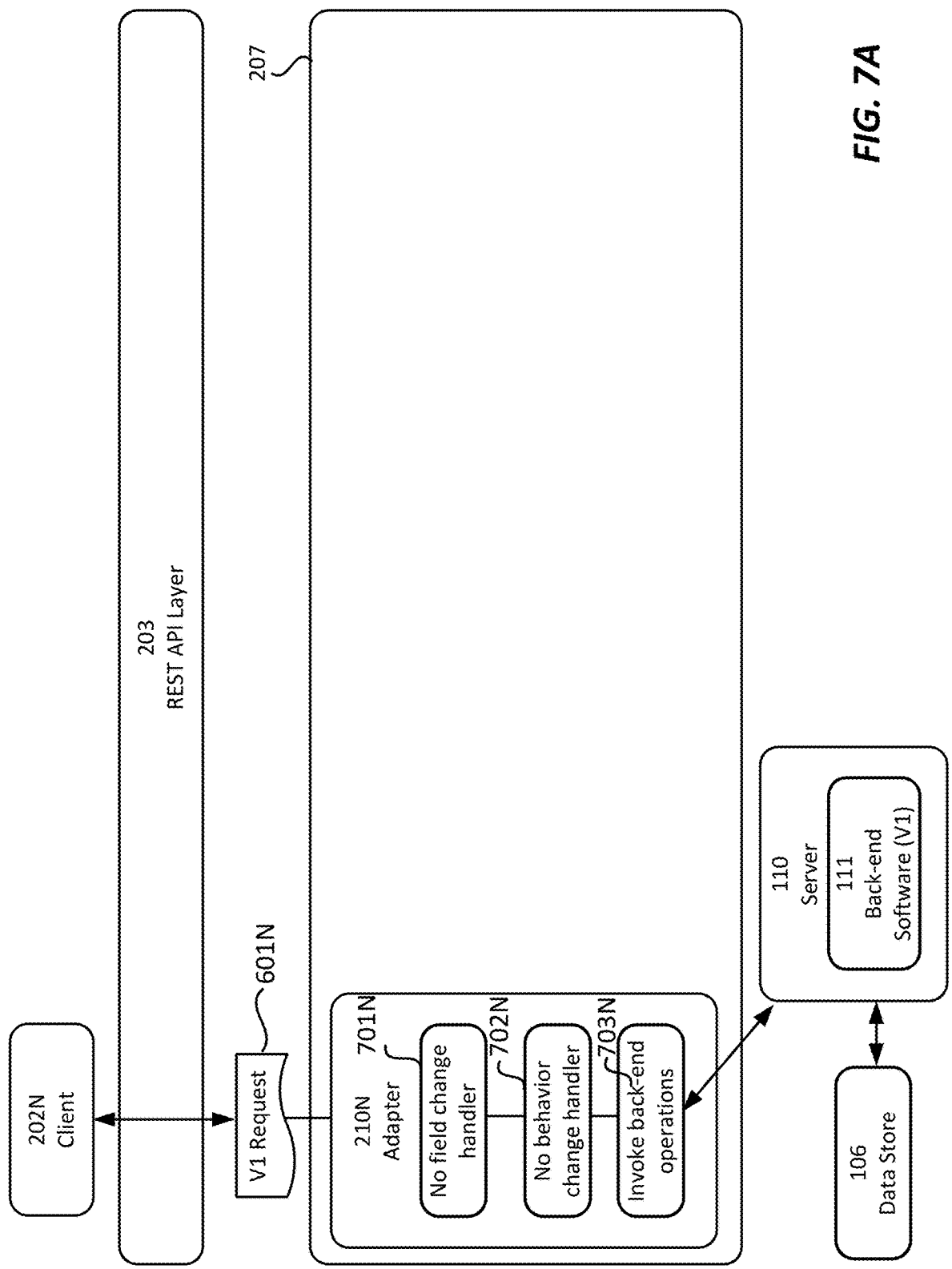

In FIG. 7A, server 110 is running API version 1 (V1) of back-end software 111. Adapter layer 207 contains one standalone adapter 210N that directly transforms request 601N received from client 202N via REST API layer 203 into a format understandable by back-end software 111 running on server 110. Adapter 210N performs no special field handling 701N and no special behavior handling 702N, but is able to invoke 703N back-end operations by transmitting request 601N in a format compatible with back-end software 111 running on server 110. Subsequently, adapter 210N s receives a response from back-end software 111 running on server 110, transforms the response into an API-compatible format, and returns the response to client 202N.

Figure 7B:
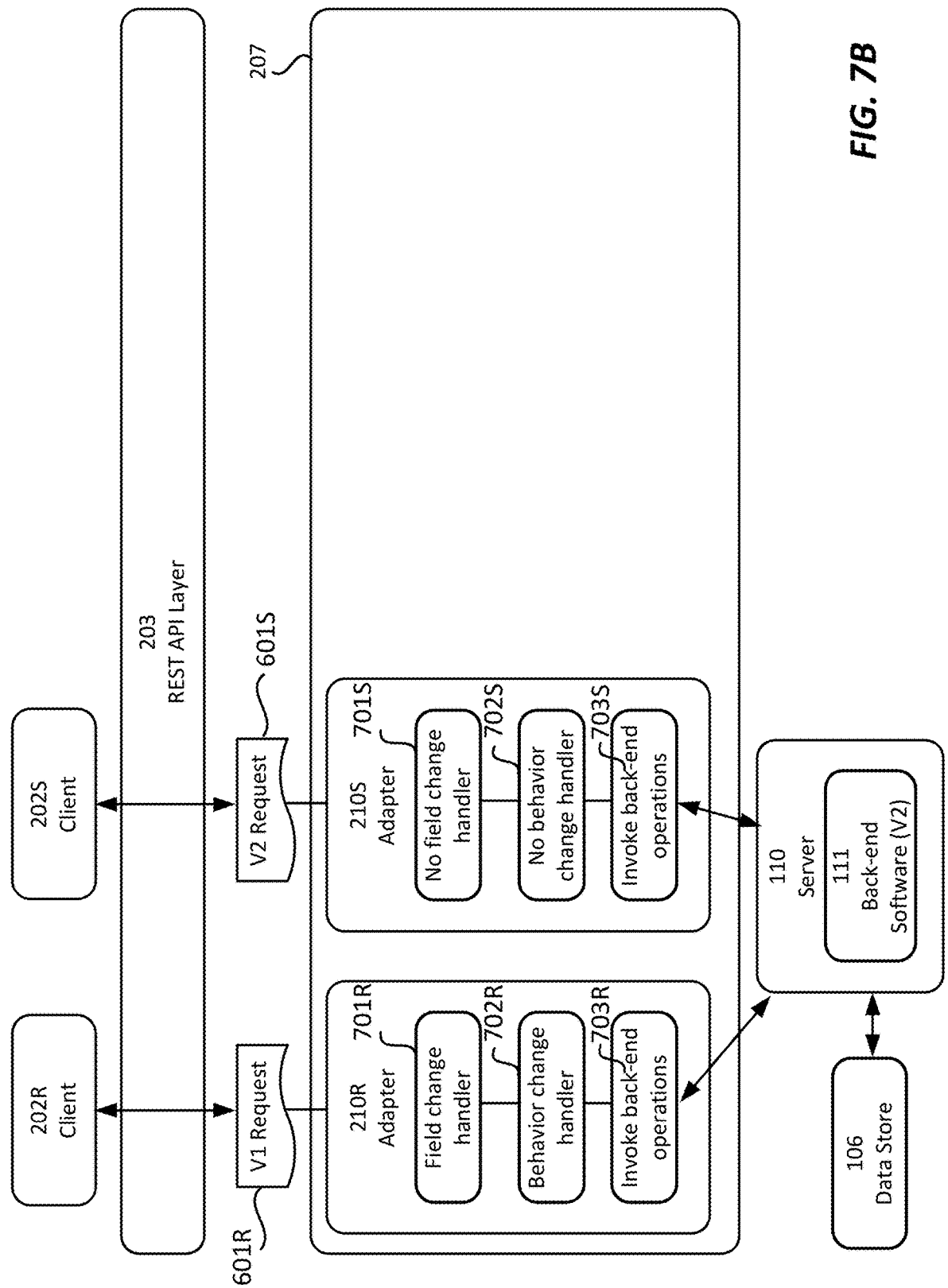

In FIG. 7B, field changes and a major behavior change have been implemented in back-end software 111, which is now running API version 2 (V2). Adapter layer 207 now contains two standalone adapters, including:

adapter 210R, which directly transforms request 601R received from client 202R; and adapter 210S, which directly transforms request 601S received from client 202S.

Requests 601R, 601S are received via REST API layer 203. Both adapters 210R, 210S transform their respective requests 601R, 601S into a format understandable by back-end software 111 running on server 110. In this example, request 601R is in an older format; therefore adapter 210R contains field change handler 701R and behavior change handler 702R to transform request 601R from the older format to one understandable by back-end software 111. Request 601S is in the current format; therefore adapter 210S performs no special field handling 701S and no special behavior handling 702S. Both adapters 210R, 210S invoke 703R, 703S back-end operations by transmitting transformed requests in back-end-compatible format to back-end software 111 running on sewer 110. Subsequently, adapters 210R, 210S receive responses from back-end software 111 running on server 110, transform these responses into an API-compatible format, and return the responses to their respective clients 202R, 202S.

Figure 7C:
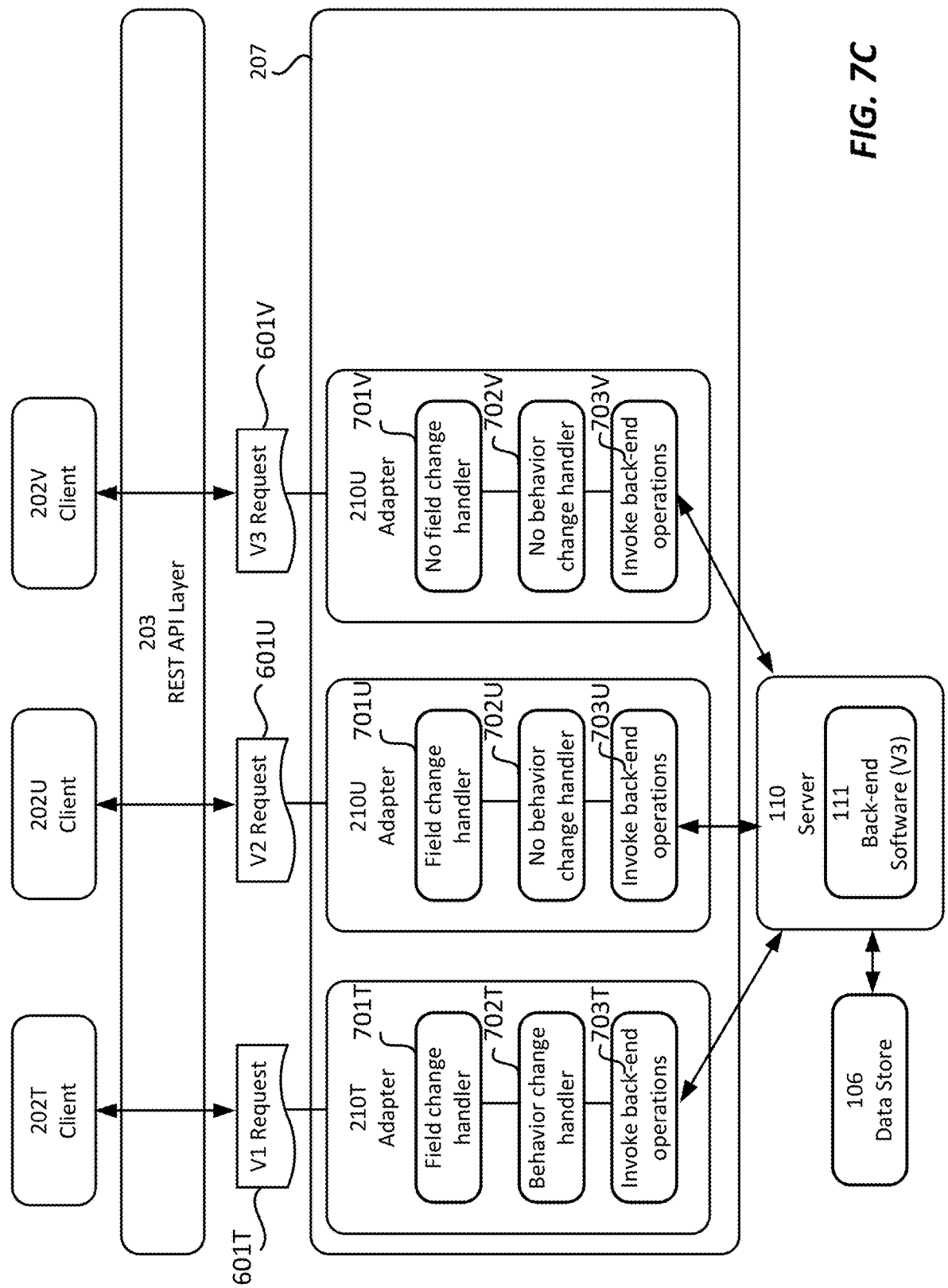

In FIG. 7C, field changes have been implemented in back-end software 111, which is now running API version 3 (V3). Adapter layer 207 now contains three standalone adapters, including:

adapter 210T, which directly transforms request 601T received from client 202T;

adapter 210U, which directly transforms request 601U received from client 202U; and adapter 210V, which directly transforms request 601V received from client 202V. Requests 601T, 601U, 601V are received via REST API layer 203.

All three adapters 210T, 210U, 210V transform their respective requests 601T, 601U, 601V into a format understandable by back-end software 111 running on server 110. In this example, request 601T is in an older format; therefore adapter 210T contains field change handler 701T and behavior change handler 702T to transform request 601T from the older format to one understandable by back-end software 111. Request 601U is also in an older format; therefore adapter 210U contains field change handler 701U and behavior change handler 702U to transform request 601U from the older format to one understandable by back-end software 111. Request 601V is in the current format; therefore adapter 210V performs no special field handling 701V and no special behavior handling 702V. Adapters 210T, 210U, 210V invoke 703T, 703U, 703V back-end operations by transmitting transformed requests in back-end-compatible format to back-end software 111 running on server 110. Subsequently, adapters 210T, 210U, 210V receive responses from back-end software 111 running on server 110, transform these responses into an API-compatible format, and return the responses to their respective clients 202T, 202U, 202V.

In FIG. 7D, field changes and a major behavior change have been implemented in back-end software 111, which is now running API version 4 (V4). Adapter layer 207 now contains four standalone adapters, including:

adapter 210W, which directly transforms request 601W received from client 202W;

adapter 210X, which directly transforms request 601X received from client 202X;

adapter 210Y, which directly transforms request 601Y received from client 202Y; and adapter 210Z, which directly transforms request 601Z received from client 202Z.

Requests 601W, 601X, 601Y, 601Z are received via REST API layer 203. All four adapters 210W, 210X, 210Y, 210Z transform their respective requests 601W, 601X, 601Y, 601Z into a format understandable by back-end software 111 running on server 110. In this example, requests 601W, 601X, 601Y are in older formats; therefore adapters 210W, 210X, 210Y contain field change handlers 701W, 701X, 701Y (respectively), and behavior change handlers 702W, 702X, 702Y (respectively), to transform requests 601W, 601X, 601Y (respectively) from the older formats to one understandable by back-end software 111. Request 601Z is in the current format; therefore adapter 210Z performs no special field handling 701Z and no special behavior handling 702Z. Adapters 210W, 210X, 210Y, 210Z invoke 703W, 703X, 703Y, 703Z back-end operations by transmitting transformed requests in back-end-compatible format to back-end software 111 running on server 110. Subsequently, adapters 210W, 210X, 210Y, 210Z receive responses from back-end software 111 running on server 110, transform these responses into an API-compatible format, and return the responses to their respective clients 202W, 202X, 202Y, 202Z.

Figure 8A:
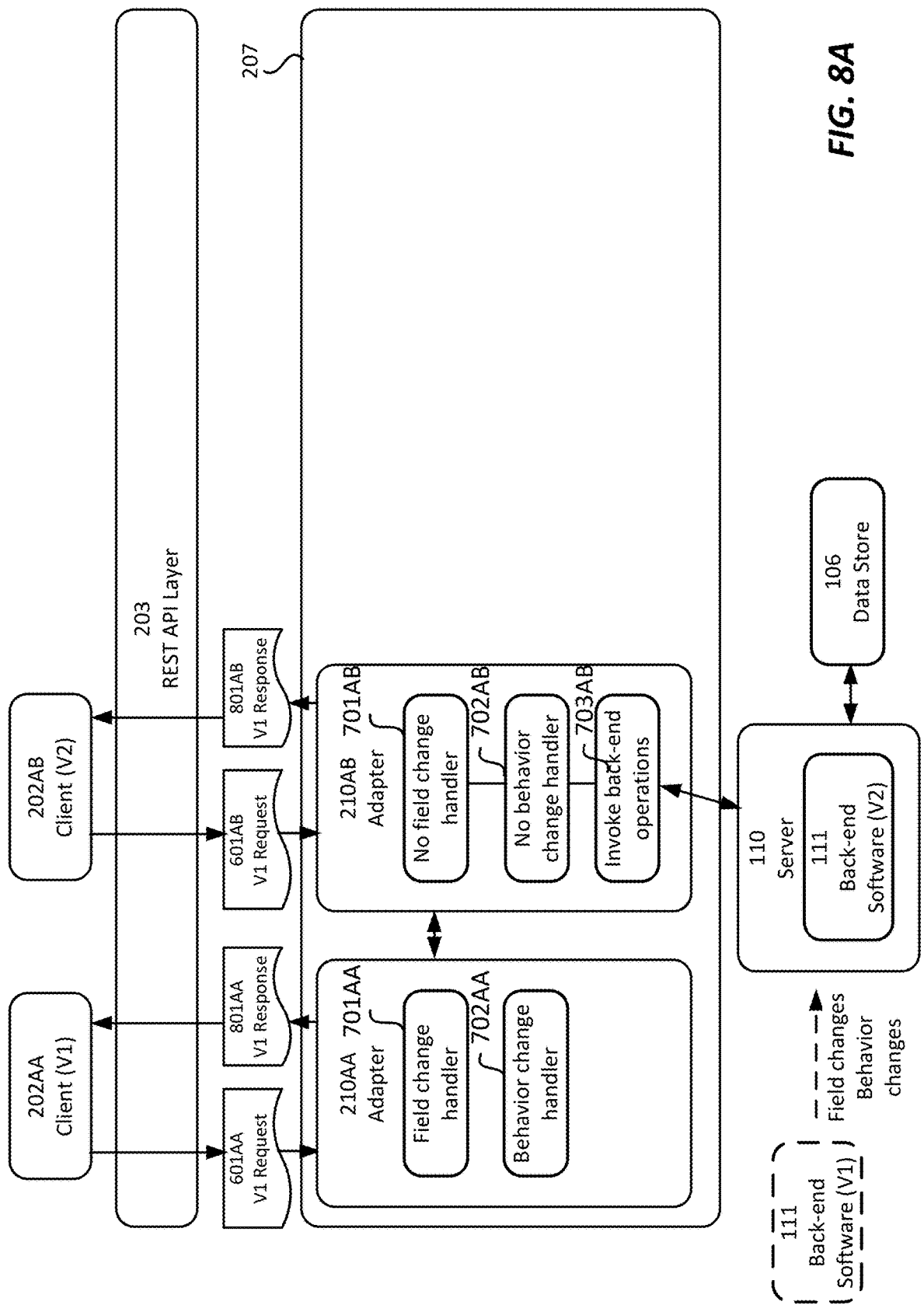
Figure 8C:
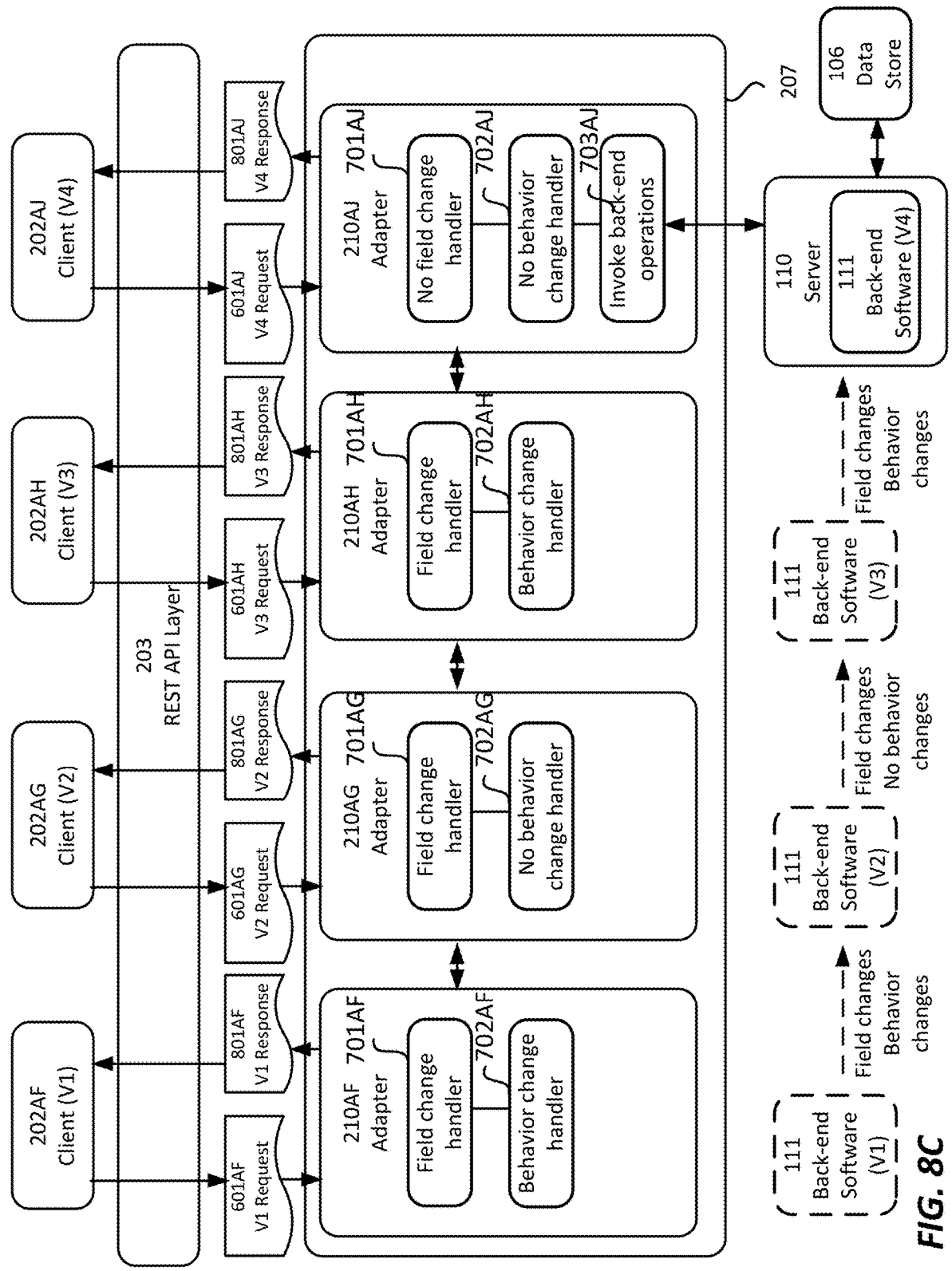

Referring now to FIGS. 8A through 8C, there are shown block diagrams depicting examples of an adapter layer 207 including chained adapters 202, according to one embodiment.

In FIG. 8A, field changes and a major behavior change have been implemented in back-end software 111, which previously ran API version 1 (V1), but is now running API version 2 (V2). Adapter layer 207 contains two chained adapters, including:

adapter 210AA including:

field change handler 701AA, which handles the field changes; and behavior change handler 702AA, which handles the behavior change; and adapter 210AB including no field change handler 701AB and no behavior change handler 702AB.

Requests 601AA, 601AB are received via REST API layer 203. In this example, adapter 210AA handles request 601AA from client 202AA running API version 1 (V1). Adapter 210AA applies field change handler 701AA and behavior change handler 702AA to incoming request 601AA, and then passes the transformed request to adapter 210AB. Adapter 210AB transforms the request into a format understandable by back-end software 111 running on server 110. Adapter 210AB invokes 703AB back-end operations by transmitting transformed requests in back-end-compatible format to back-end software 111 running on server 110. Subsequently, adapter 210AB receives a response from back-end software 111 running on server 110, transforms the response and passes it to adapter 210AA, which further transforms the response to V1 response 801AA, and passes it to client 202AA.

Request 601AB from client 202AB running API version 2 (V2) is handled by adapter 210AB, bypassing adapter 210AA. Adapter 210AB transforms the request into a format understandable by back-end software 111 running on server 110. Adapter 210AB invokes 703AB back-end operations by transmitting transformed requests in back-end-compatible format to back-end software 111 running on server 110. Subsequently, adapter 210AB receives a response from back-end software 111 running on server 110, transforms the response to V2 response 801AB and passes it to client 202AB, again bypassing adapter 210AA.

In FIG. 8B, additional field changes (but no behavior changes) have been implemented in back-end software 111, which is now running API version 3 (V3). Adapter layer 207 contains three chained adapters, including:
   adapter 210AC including field change handler 701AC and behavior change handler 702AC;
   adapter 210AD including field change handler 701AD but no behavior change handler 702AD; and
   adapter 210AE including no field change handler 701AE and no behavior change handler 702AE.

Requests 601AC, 601AD, 601AE are received via REST API layer 203. In this example, adapter 210AC handles request 601AC from client 202AC running API version 1 (V1). Adapter 210AC applies field change handler 701AC and behavior change handler 702AC to incoming request 601AC, and then passes the transformed request to adapter 210AD. Adapter 210AD applies field change handler 701AD to the request, and passes the transformed request to adapter 210AE. Adapter 210AE transforms the request into a format understandable by back-end software 111 running on server 110. Adapter 210AE invokes 703AE back-end operations by transmitting transformed requests in back-end-compatible format to back-end software 111 running on server 110. Subsequently, adapter 210AE receives a response from back-end software 111 running on server 110, transforms the response and passes it to adapter 210AD, which further transforms the response and passes it to adapter 210AC, which further transforms the response to V1 response 801AC, and passes it to client 202AC.

Request 601AD from client 202AD running API version 2 (V2) is handled by adapter 210AD, bypassing adapter 210AC. Adapter 210AD applies field change handler 701AD to the request, and passes the transformed request to adapter 210AE. Adapter 210AE transforms the request into a format understandable by back-end software 111 running on server 110. Adapter 210AE invokes 703AE back-end operations by transmitting transformed requests in backend-compatible format to back-end software 111 running on server 110. Subsequently, adapter 210AE receives a response from back-end software 111 running on server 110, transforms the response and passes it to adapter 210AD, which further transforms the response to V2 response 801AD and passes it to client 202AD, again bypassing adapter 210AC.

Request 601AE from client 202AE running API version 3 (V3) is handled by adapter 210AE, bypassing adapters 210AC, 210AD. Adapter 210AE transforms the request into a format understandable by back-end software 111 running on server 110. Adapter 210AE invokes 703AE back-end operations by transmitting transformed requests in back-end-compatible format to back-end software 111 running on server 110. Subsequently, adapter 210AE receives a response from back-end software 111 running on server 110, transforms the response to V3 response 801AE and passes it to client 202AE, again bypassing adapters 210AC, 210AD.

In FIG. 8C, additional field changes and behavior changes have been implemented in back-end software 111, which is now running API version 4 (V4). Adapter layer 207 contains four chained adapters, including:
   adapter 210AF including field change handler 701AF and behavior change handler 702AF;
   adapter 210AG including field change handler 701AG but no behavior change handler 702AG;
   adapter 210AH including field change handler 701AH and behavior change handler 702AH; and
   adapter 210AJ including no field change handler 701AJ and no behavior change handler 702AJ.

Requests 601AF, 601AG, 601AH, 601AJ are received via REST API layer 203. In this example, adapter 210AF handles request 601AF from client 202AF running API version 1 (V1). Adapter 210AF applies field change handler 701AF and behavior change handler 702AF to incoming request 601AF, and then passes the transformed request to adapter 210AG. Adapter 210AG applies field change handler 701AG to the request, and passes the transformed request to adapter 210AH. Adapter 210AH applies field change handler 701AH and behavior change handler 702AH to the transformed request, and then passes the transformed request to adapter 210AJ. Adapter 210AJ transforms the request into a format understandable by back-end software 111 running on server 110. Adapter 210AJ invokes 703AJ back-end operations by transmitting transformed requests in back-end-compatible format to back-end software 111 running on server 110. Subsequently, adapter 210AJ receives a response from back-end software 111 running on server 110, transforms the response and passes it to adapter 210AH, which further transforms the response and passes it to adapter 210AG, which further transforms the response and passes it to adapter 210AF, which further transforms the response to V1 response 801AF, and passes it to client 202AF.

Request 601AG from client 202AG running API version 2 (V2) is handled by adapter 210AG, bypassing adapter 210AF. Adapter 210AG applies field change handler 701AG to the request, and passes the transformed request to adapter 210AH. Adapter 210AH applies field change handler 701AH and behavior change handler 702AH to the transformed request, and then passes the transformed request to adapter 210AJ. Adapter 210AJ transforms the request into a format understandable by back-end software 111 running on server 110. Adapter 210AJ invokes 703AJ back-end operations by transmitting transformed requests in back-end-compatible format to back-end software 111 running on server 110. Subsequently, adapter 210AJ receives a response from back-end software 111 running on server 110, transforms the response and passes it to adapter 210AH, which further transforms the response and passes it to adapter 210AG, which further transforms the response to V2 response 801AG and passes it to client 202AF, again bypassing adapter 210AF.

Request 601AH from client 202AH running API version 3 (V3) is handled by adapter 210AH, bypassing adapters 210AF, 210AG. Adapter 210AH applies field change handler 701AH and behavior change handler 702AG to request 601AH, and then passes the transformed request to adapter 210AJ. Adapter 210AJ transforms the request into a format understandable by back-end software 111 running on server 110. Adapter 210AJ invokes 703AJ back-end operations by transmitting transformed requests in back-end-compatible format to back-end software 111 running on server 110. Subsequently, adapter 210AJ receives a response from back-end software 111 running on server 110, transforms the response and passes it to adapter 210AH, which further transforms the response to V3 response 801AH and passes it to client 202AH, again bypassing adapters 210AF, 210AG.

Request 601AJ from client 202AJ running API version 4 (V4) is handled by adapter 210AJ, bypassing adapters 210AF, 210AG, 210AH. Adapter 210AJ transforms the request into a format understandable by back-end software 111 running on server 110. Adapter 210AJ invokes 703AJ back-end operations by transmitting transformed requests in back-end-compatible format to back-end software 111 running on server 110. Subsequently, adapter 210AJ receives a response from back-end software 111 running on server 110, transforms the response to V4 response 801AJ and passes it to client 202AJ, again bypassing adapters 210AF, 210AG, 210AH.

In at least one embodiment, when the behavior of an application object has changed dramatically or has been redesigned from one version to the next, a new API object may be introduced for the underlying object. When introducing a new object is not possible or desirable, behavior changes can be absorbed by chained adapters.

One skilled in the art will recognize that the examples depicted and described herein are merely illustrative, and that other arrangements of user interface elements can be used. In addition, some of the depicted elements can be omitted or changed, and additional elements depicted, without departing from the essential characteristics.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the described system and method include: a mobile phone, personal digital assistant, smartphone, kiosk, server computer, enterprise computing device, desktop computer, laptop computer, tablet computer, consumer electronic device, or the like. An electronic device may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A computer-implemented method for using chained adapters to transform requests and responses, comprising:
   a) receiving a request from a client device in a client/server architecture, the request having a first request format;
   b) determining whether the first request format corresponds to a request format expected by the server;
   c) responsive to the first request format corresponding to the request format expected by the server, forwarding the request to the server;
   d) responsive to the first request format not corresponding to the request format expected by the server:
      d.1) using an adapter layer comprising a plurality of chained adapters to transform the request to the request format expected by the server, wherein each adapter in the adapter layer transforms the request from a format associated with one software version to a format associated with another software version; and
      d.2) forwarding the transformed request to the server;
   e) receiving a response from the server, the response having a first response format;
   f) determining whether the first response format corresponds to a response format expected by the client device;
   g) responsive to the first response format corresponding to the response format expected by the client device, forwarding the response to the client device; and
   h) responsive to the first response format not corresponding to the response format expected by the client device:
      h.1) using the adapter layer comprising the plurality of chained adapters to transform the response to the response format expected by the client device, wherein each adapter in the adapter layer transforms the response from a format associated with one software version to a format associated with another software version; and
      h.2) forwarding the transformed response to the client device;
   wherein step d.1) comprises:
   d.1.1) determining whether any new adapters are needed; and
   d.1.2) responsive to any new adapters being needed, for each needed new adapter:
      d.1.2.1) determining whether the transformation to be performed by the adapter is limited to exposing new objects and/or adding new fields;
      d.1.2.2) responsive to the transformation to be performed by the adapter being limited to exposing new objects and/or adding new fields:
         d.1.2.2.1) installing a generic adapter as the new adapter, wherein the generic adapter can be configured using an object and API schema definition/mapping; and
         d.1.2.2.2) configuring the generic adapter to invoke back-end operations based on received API-formatted requests; and
      d.1.2.3) responsive to the transformation to be performed by the adapter not being limited to exposing new objects and/or adding new fields, installing a specialized adapter as the new adapter.

2. The method of claim 1, wherein:
   step d.1) comprises:
      d.1.1) forwarding the request to a one of the adapters in the plurality of chained adapters, the adapter configured to transform the request to another request format;
      d.1.2) determining whether the request format of the transformed request corresponds to the request format expected by the server;
      d.1.3) responsive to the request format of the transformed request corresponding to the request format expected by the server, forwarding the transformed request to the server; and
      d.1.4) responsive to the request format of the transformed request not corresponding to the request format expected by the server:
         d.1.4.1) forwarding the transformed request to a subsequent adapter in the plurality of chained adapters, the subsequent adapter configured to transform the request to another request format; and
         d.1.4.2) repeating steps d.1.2) through d.1.4.2); and
   step h.1) comprises:
      h.1.1) forwarding the response to one of the adapters in the plurality of chained adapters, the adapter configured to transform the response to another response format;
      h.1.2) determining whether the response format of the transformed response corresponds to the response format expected by the client device;

h.1.3) responsive to the response format of the transformed response corresponding to the response format expected by the client device, forwarding the transformed response to the client device; and
h.1.4) responsive to the response format of the transformed response not corresponding to the response format expected by the client device:
  h.1.4.1) forwarding the transformed response to a previous adapter in the chain of adapters, the previous adapter configured to transform the response to another response format; and
  h.1.4.2) repeating steps h.1.2) through h.1.4.2).

3. The method of claim 1, wherein each request format corresponds to a version of an application programming interface (API), and each response format corresponds to a version of an API.

4. The method of claim 3, wherein:
the plurality of chained adapters are configured to enable requests formatted according to a plurality of different versions of the API to be transformed to the request format expected by the server; and
the plurality of chained adapters are further configured to enable responses received from the server to be transformed to response formats expected by the plurality of different versions of the API.

5. The method of claim 3, wherein the adapter layer implements a single public schema for the API.

6. The method of claim 3, wherein the adapter layer comprises at least one generic adapter.

7. The method of claim 1, wherein at least one adapter in the plurality of chained adapters is configured to handle at least one field change from one request format to another request format.

8. The method of claim 1, wherein at least one adapter in the plurality of chained adapters is configured to handle at least one behavior change from one request format to another request format.

9. A non-transitory computer-readable medium for using chained adapters to transform requests and responses, comprising instructions stored thereon, that when performed by a hardware processor, perform the steps of:
a) receiving a request from a client device in a client/server architecture, the request having a first request format;
b) determining whether the first request format corresponds to a request format expected by the server;
c) responsive to the first request format corresponding to the request format expected by the server, forwarding the request to the server;
d) responsive to the first request format not corresponding to the request format expected by the server:
  d.1) using an adapter layer comprising a plurality of chained adapters to transform the request to the request format expected by the server, wherein each adapter in the adapter layer transforms the request from a format associated with one software version to a format associated with another software version; and
  d.2) forwarding the transformed request to the server;
e) receiving a response from the server, the response having a first response format;
f) determining whether the first response format corresponds to a response format expected by the client device;
g) responsive to the first response format corresponding to the response format expected by the client device, forwarding the response to the client device; and
h) responsive to the first response format not corresponding to the response format expected by the client device:
  h.1) using the adapter layer comprising the plurality of chained adapters to transform the response to the response format expected by the client device, wherein each adapter in the adapter layer transforms the response from a format associated with one software version to a format associated with another software version; and
  h.2) forwarding the transformed response to the client device;
wherein step d.1) comprises:
d.1.1) determining whether any new adapters are needed; and
d.1.2) responsive to any new adapters being needed, for each needed new adapter:
  d.1.2.1) determining whether the transformation to be performed by the adapter is limited to exposing new objects and/or adding new fields;
  d.1.2.2) responsive to the transformation to be performed by the adapter being limited to exposing new objects and/or adding new fields:
    d.1.2.2.1) installing a generic adapter as the new adapter, wherein the generic adapter can be configured using an object and API schema definition/mapping; and
    d.1.2.2.2) configuring the generic adapter to invoke back-end operations based on received API-formatted requests; and
  d.1.2.3) responsive to the transformation to be performed by the adapter not being limited to exposing new objects and/or adding new fields, installing a specialized adapter as the new adapter.

10. The non-transitory computer-readable medium of claim 9, wherein:
step d.1) comprises:
d.1.1) forwarding the request to one of the adapters in the plurality of chained adapters, the adapter configured to transform the request to another request format;
d.1.2) determining whether the request format of the transformed request corresponds to the request format expected by the server;
d.1.3) responsive to the request format of the transformed request corresponding to the request format expected by the server, forwarding the transformed request to the server; and
d.1.4) responsive to the request format of the transformed request not corresponding to the request format expected by the server:
  d.1.4.1) forwarding the transformed request to a subsequent adapter in the plurality of chained adapters, the subsequent adapter configured to transform the request to another request format; and
  d.1.4.2) repeating steps d.1.2) through d.1.4.2); and
step h.1) comprises:
h.1.1) forwarding the response to one of the adapters in the plurality of chained adapters, the adapter configured to transform the response to another response format;
h.1.2) determining whether the response format of the transformed response corresponds to the response format expected by the client device;
h.1.3) responsive to the response format of the transformed response corresponding to the response format expected by the client device, forwarding the transformed response to the client device; and h.1.4) responsive to the response format of the transformed response not corresponding to the response format expected by the client device:

h.1.4.1) forwarding the transformed response to a previous adapter in the chain of adapters, the previous adapter configured to transform the response to another response format; and h.1.4.2) repeating steps h.1.2) through h.1.4.2).

11. The non-transitory computer-readable medium of claim 9, wherein each request format corresponds to a version of an application programming interface (API), and each response format corresponds to a version of an API.

12. The non-transitory computer-readable medium of claim 11, wherein:

the plurality of chained adapters are configured to enable requests formatted according to a plurality of different versions of the API to be transformed to the request format expected by the server; and the plurality of chained adapters are further configured to enable responses received from the server to be transformed to response formats expected by the plurality of different versions of the API.

13. The non-transitory computer-readable medium of claim 11, wherein the adapter layer implements a single public schema for the API.

14. The non-transitory computer-readable medium of claim 11, wherein the adapter layer comprises at least one generic adapter.

15. The non-transitory computer-readable medium of claim 9, wherein at least one adapter in the plurality of chained adapters is configured to handle at least one field change from one request format to another request format.

16. The non-transitory computer-readable medium of claim 9, wherein at least one adapter in the plurality of chained adapters is configured to handle at least one behavior change from one request format to another request format.

17. A system for using chained adapters to transform requests and responses, comprising:

a server, configured to receive requests and to respond to the received requests; and an adapter layer, communicatively coupled to the server and to at least one client device, comprising a plurality of chained adapters, the adapter layer configured to perform the steps of:

a) receiving a request from one of the at least one client device in a client/server architecture, the request having a first request format;

b) determining whether the first request format corresponds to a request format expected by the server;

c) responsive to the first request format corresponding to the request format expected by the server, forwarding the request to the server;

d) responsive to the first request format not corresponding to the request format expected by the server:

d.1) using the plurality of chained adapters to transform the request to the request format expected by the server, wherein each adapter in the adapter layer transforms the request from a format associated with one software version to a format associated with another software version; and d.2) forwarding the transformed request to the server;

e) receiving a response from the server, the response having a first response format;

f) determining whether the first response format corresponds to a response format expected by the client device from which the request was received;

g) responsive to the first response format corresponding to the response format expected by the client device from which the request was received, forwarding the response to the client device from which the request was received; and h) responsive to the first response format not corresponding to the response format expected by the client device from which the request was received:

h.1) using the plurality of chained adapters to transform the response to the response format expected by the client device from which the request was received, wherein each adapter in the adapter layer transforms the response from a format associated with one software version to a format associated with another software version; and h.2) forwarding the transformed response to the client device from which the request was received;

wherein step d.1) comprises:

d.1.1) determining whether any new adapters are needed; and d.1.2) responsive to any new adapters being needed, for each needed new adapter:

d.1.2.1) determining whether the transformation to be performed by the adapter is limited to exposing new objects and/or adding new fields;

d.1.2.2) responsive to the transformation to be performed by the adapter being limited to exposing new objects and/or adding new fields:

d.1.2.2.1) installing a generic adapter as the new adapter, wherein the generic adapter can be configured using an object and API schema definition/mapping; and d.1.2.2.2) configuring the generic adapter to invoke back-end operations based on received API-formatted requests; and d.1.2.3) responsive to the transformation to be performed by the adapter not being limited to exposing new objects and/or adding new fields, installing a specialized adapter as the new adapter.

18. The system of claim 17, wherein:

step d.1) comprises:

d.1.1) forwarding the request to an adapter in a chain of adapters, the adapter configured to transform the request to another request format;

d.1.2) determining whether the request format of the transformed request corresponds to the request format expected by the server;

d.1.3) responsive to the request format of the transformed request corresponding to the request format expected by the server, forwarding the transformed request to the server; and d.1.4) responsive to the request format of the transformed request not corresponding to the request format expected by the server:

d.1.4.1) forwarding the transformed request to a subsequent adapter in the chain of adapters, the subsequent adapter configured to transform the request to another request format; and d.1.4.2) repeating steps d.2) through d.4.2); and step h.1) comprises:

h.1.1) forwarding the response to an adapter in the chain of adapters, the adapter configured to transform the response to another response format;

h.1.2) determining whether the response format of the transformed response corresponds to the response format expected by the client device from which the request was received;
h.1.3) responsive to the response format of the transformed response corresponding to the response format expected by the client device from which the request was received, forwarding the transformed response to the client device from which the request was received; and
h.1.4) responsive to the response format of the transformed response not corresponding to the response format expected by the client device from which the request was received:
  h.1.4.1) forwarding the transformed response to a previous adapter in the chain of adapters, the previous adapter configured to transform the response to another response format; and
  h.1.4.2) repeating steps h.1.2) through h.1.4.2).

19. The system of claim 17, wherein each request format corresponds to a version of an application programming interface (API), and each response format corresponds to a version of an API.

20. The system of claim 19, wherein:
the plurality of chained adapters are configured to enable requests formatted according to a plurality of different versions of the API to be transformed to the request format expected by the server; and
the plurality of chained adapters are further configured to enable responses received from the server to be transformed to response formats expected by the plurality of different versions of the API.

21. The system of claim 19, wherein the adapter layer implements a single public schema for the API.

22. The system of claim 19, wherein the adapter layer comprises at least one generic adapter.

23. The system of claim 17, wherein at least one adapter in the plurality of chained adapters is configured to handle at least one field change from one request format to another request format.

24. The system of claim 17, wherein at least one adapter in the plurality of chained adapters is configured to handle at least one behavior change from one request format to another request format.

* * * * *